US008967480B2

(12) United States Patent
Itwaru

(10) Patent No.: US 8,967,480 B2
(45) Date of Patent: Mar. 3, 2015

(54) SYSTEM AND METHOD FOR PROCESSING FUNDS TRANSFER BETWEEN ENTITIES BASED ON RECEIVED OPTICAL MACHINE READABLE IMAGE INFORMATION

(71) Applicant: Mark Itwaru, Toronto (CA)

(72) Inventor: Mark Itwaru, Toronto (CA)

(73) Assignee: Riarera Corp., Toronto (CA)

( * ) Notice: Subject to any disclaimer, the term of this patent is extended or adjusted under 35 U.S.C. 154(b) by 0 days.

(21) Appl. No.: 14/087,195

(22) Filed: Nov. 22, 2013

(65) Prior Publication Data

US 2014/0175166 A1     Jun. 26, 2014

Related U.S. Application Data

(63) Continuation of application No. 13/397,233, filed on Feb. 15, 2012, now Pat. No. 8,616,453.

(60) Provisional application No. 61/485,075, filed on May 11, 2011.

(51) Int. Cl.
G06K 7/10       (2006.01)
G06Q 40/02     (2012.01)
G06Q 20/10     (2012.01)

(52) U.S. Cl.
CPC ............. *G06Q 40/02* (2013.01); *G06Q 20/10* (2013.01)
USPC ............ 235/462.02; 235/462.01; 235/462.09; 235/379; 235/380; 235/383

(58) Field of Classification Search
CPC .......... G06Q 20/3274; G06Q 20/3276; G06Q 20/32; G06Q 20/322–20/3223; G06Q 20/325; G06Q 20/425; G06Q 20/3255; G06K 7/1417; G06K 19/06112; G06K 7/1439; G06K 7/1443; H04W 4/14
USPC .......... 235/462.01, 462.02, 462.09, 379, 380, 235/383
See application file for complete search history.

(56) References Cited

U.S. PATENT DOCUMENTS

| 5,729,594 A | 3/1998 | Klingman |
| 5,778,173 A | 7/1998 | Apte |

(Continued)

FOREIGN PATENT DOCUMENTS

| CA | 2769235 A1 | 2/2011 |
| DE | 102007059816 A1 | 6/2009 |

(Continued)

OTHER PUBLICATIONS

International Search Report and Written Opinion dated Aug. 27, 2012 issued from the Canadian Intellectual Property Office relating to PCT International Patent Application No. PCT/CA2012/000453.

(Continued)

*Primary Examiner* — Kristy A Haupt
(74) *Attorney, Agent, or Firm* — Grant Tisdall; Gowling Lafleur Henderson LLP

(57) ABSTRACT

A system and method for coordinating processing of a funds transfer transaction between a transaction requestor and a transaction responder over a communications network. The transaction system comprises receiving a funds amount, requestor identification information, and responder identification information, such that at least one of the funds amount, the requestor identification information, or the responder identification information is encoded in symbology information embodied in a barcode. The system also decodes the symbology information into unencoded information using a coding scheme of the barcode and generates a funds transfer request for the funds transfer transaction, such that the funds transfer request has content including the unencoded information decoded from the symbology information. The system also sends the funds transfer request to a transaction processing system for subsequent settlement, as well as receives transaction confirmation messages.

22 Claims, 7 Drawing Sheets

(56) References Cited

U.S. PATENT DOCUMENTS

| | | |
|---|---|---|
| 5,799,285 A | 8/1998 | Klingman |
| 5,903,721 A | 5/1999 | Sixtus |
| 5,923,735 A | 7/1999 | Swartz et al. |
| 5,963,915 A | 10/1999 | Kirsch |
| 5,970,475 A | 10/1999 | Barnes et al. |
| 5,992,752 A | 11/1999 | Wilz, Sr. et al. |
| 6,012,144 A | 1/2000 | Pickett |
| 6,038,589 A | 3/2000 | Holdsworth |
| 6,058,250 A | 5/2000 | Harwood et al. |
| 6,078,902 A | 6/2000 | Schenkler |
| 6,086,618 A | 7/2000 | Al-Hilali et al. |
| 6,088,683 A | 7/2000 | Jalili |
| 6,138,146 A | 10/2000 | Moon et al. |
| 6,233,565 B1 | 5/2001 | Lewis et al. |
| 6,332,134 B1 | 12/2001 | Foster |
| 6,675,008 B1 | 1/2004 | Paik et al. |
| 6,704,873 B1 | 3/2004 | Underwood |
| 7,379,921 B1 | 5/2008 | Kiliccote |
| 7,387,250 B2 | 6/2008 | Muni |
| 7,581,257 B1 | 8/2009 | O'Hara |
| 8,016,187 B2 | 9/2011 | Frantz et al. |
| 8,275,699 B2 | 9/2012 | Shader et al. |
| 2002/0062281 A1 | 5/2002 | Singhal |
| 2002/0066039 A1 | 5/2002 | Dent |
| 2002/0066042 A1 | 5/2002 | Matsumoto et al. |
| 2002/0069165 A1 | 6/2002 | O'Neil |
| 2002/0077976 A1 | 6/2002 | Meyer et al. |
| 2002/0107745 A1 | 8/2002 | Loeser |
| 2003/0195843 A1 | 10/2003 | Matsuda et al. |
| 2005/0029358 A1 | 2/2005 | Mankins |
| 2005/0125301 A1 | 6/2005 | Muni |
| 2005/0197968 A1 | 9/2005 | Das et al. |
| 2007/0119917 A1 | 5/2007 | Tomikawa et al. |
| 2007/0194123 A1 | 8/2007 | Frantz et al. |
| 2007/0244811 A1 | 10/2007 | Tumminaro |
| 2007/0255620 A1 | 11/2007 | Tumminaro et al. |
| 2008/0172314 A1 | 7/2008 | Hahn-Carlson |
| 2008/0222048 A1* | 9/2008 | Higgins et al. .................. 705/67 |
| 2008/0285755 A1 | 11/2008 | Camus et al. |
| 2008/0313081 A1 | 12/2008 | Wee |
| 2009/0084840 A1* | 4/2009 | Williams et al. .............. 235/379 |
| 2009/0090783 A1 | 4/2009 | Killian et al. |
| 2009/0108080 A1 | 4/2009 | Meyer et al. |
| 2009/0222353 A1 | 9/2009 | Guest et al. |
| 2009/0240626 A1 | 9/2009 | Hasson et al. |
| 2009/0254479 A1 | 10/2009 | Pharris |
| 2009/0254485 A1 | 10/2009 | Baentsch et al. |
| 2009/0266893 A1 | 10/2009 | Chen |
| 2010/0138344 A1 | 6/2010 | Wong et al. |
| 2010/0169223 A1 | 7/2010 | Yuan |
| 2010/0211506 A1 | 8/2010 | Chang et al. |
| 2011/0145093 A1 | 6/2011 | Paradise et al. |
| 2011/0212707 A1 | 9/2011 | Mahalal |
| 2011/0244920 A1 | 10/2011 | Coppinger |
| 2011/0251892 A1 | 10/2011 | Laracey |
| 2012/0030121 A1 | 2/2012 | Grellier |
| 2012/0066081 A1 | 3/2012 | Shader et al. |
| 2012/0078751 A1 | 3/2012 | Macphail et al. |
| 2012/0130889 A1 | 5/2012 | Lyons et al. |
| 2012/0136797 A1 | 5/2012 | Coppinger |
| 2012/0290418 A1 | 11/2012 | Itwaru |

FOREIGN PATENT DOCUMENTS

| | | |
|---|---|---|
| EP | 0765068 A2 | 3/1997 |
| EP | 0813325 A2 | 12/1997 |
| EP | 0926611 A2 | 6/1999 |
| EP | 1921578 A1 | 5/2008 |
| EP | 2073160 A1 | 6/2009 |
| EP | 2088549 A1 | 8/2009 |
| WO | 9637848 A1 | 11/1996 |
| WO | 0195591 A1 | 12/2001 |
| WO | 02102133 A2 | 12/2002 |
| WO | 2011112752 A1 | 9/2011 |
| WO | 2011127354 A2 | 10/2011 |
| WO | 2011130422 A2 | 10/2011 |
| WO | 2012111019 A1 | 8/2012 |
| WO | 2012151660 A1 | 11/2012 |
| WO | 2012158506 A1 | 11/2012 |

OTHER PUBLICATIONS

Gao, et al., "A 2D Barcode-Based Mobile Payment System", 2009 Third International Conference on Multimedia and Ubiquitous Engineering, pp. 320-329, Jun. 4-6, 2009.

International Search Report and Written Opinion dated May 24, 2012 issued from the Canadian Intellectual Property Office relating to PCT International Patent Application No. PCT/CA2012/000223.

International Search Report and Written Opinion dated Jul. 30, 2012 issued from the Canadian Intellectual Property Office relating to PCT International Patent Application No. PCT/CA2012/000452.

Ion, et al., "Don't trust POS terminals! Verify in-shop payments with your phone", presented at Pervasive 2008 Sixth International Conference on Persuasive Computing, Sydney Australia, http://www.persuasive2008.org/.

International Search Report and Written Opinion dated Apr. 15, 2013 issued from the Canadian Intellectual Property Office relating to PCT International Patent Application No. PCT/CA2013/000135.

International Search Report and Written Opinion dated Apr. 29, 2013 issued from the Canadian Intellectual Property Office relating to PCT International Patent Application No. PCT/CA2013/000136.

* cited by examiner

SYSTEM AND METHOD FOR PROCESSING FUNDS TRANSFER BETWEEN ENTITIES BASED ON RECEIVED OPTICAL MACHINE READABLE IMAGE INFORMATION

CROSS REFERENCE TO RELATED APPLICATIONS

This application is a continuation of U.S. patent application Ser. No. 13/397,233 filed Feb. 15, 2012 which is a Non Provisional of U.S. Provisional Patent Application No. 61/485,075 filed May 11, 2011 and is a Continuation-In-Part to U.S. patent application Ser. No. 13/105,803, filed May 11, 2011, all of which are hereby incorporated by reference in their entirety.

FIELD

The present invention is related to facilitating transfer of funds between entities using optical machine readable images such as barcodes to expedite transaction processing.

BACKGROUND

Barcodes and other are optical machine readable images used extensively to represent information about an object. Decoding or reading a barcode is accomplished by translating the patterns of the barcode, such as bars and spaces in linear barcodes or blocks or other features in a 2D barcode, into the corresponding numbers or characters. Barcodes are widely used for encoding information and tracking purposes in retail, shipping and industrial settings. Barcodes and their uses are becoming more mainstream, however their uses remain mostly in providing static information about a particular product or service, or in recent years providing a static link to a website in relation to the product or service associated with the barcode.

For years, payment systems, and banking and payment processing in general, have been trying to engineer a transaction processing technology that is secure, efficient and easy to use, thereby facilitating the online transfer of funds between entities. In particular, providing one entity with some control in how their personal financial information is provided to directly another entity involved in the funds transfer has so far been elusive. This inability to involve more entity control of the funds transfer transaction between entities while at the same time streamlining the amount of time and information entities must share with each other during funds transfer has effectively relegated experience in online electronic direct funds transfer to that of yesterday rather than the future. In particular, barcodes have been used in an effort to speed up the customer shopping experiences by providing merchant terminals information about the product when scanned through a checkout scanner, i.e. the price and brief description of the product that the barcode is attached/applied to. However, any use of barcodes outside of the customer shopping experience, other than as a look up service for a price of a product on a product by product basis, is simply not available.

At the same time, developments in the field of mobile commerce are being facilitated by improved functionality and features available on mobile devices, and by such functionality and features becoming more commonplace on current mobile devices. For example, cell phones, smart phones and tablet computers nowadays are commonly integrated, multi-functional devices. In addition to their core, basic functionality, they will often have, or can be configured to have, web-enabled functionality, various other communication capabilities (e.g., e-mail, text, wi-fi, etc.), camera functions, scanning and graphical image handling functionalities and other capabilities. Graphical interfaces of desktop computers have also become more advanced in their functionality and provided features. However, to date, the direct funds transfer experience between entities (either in person or online) has not benefited from these advanced functionality and provided features of desktop GUIs and mobile devices.

SUMMARY

Presently there is a need for a system and method to facilitate the transfer of funds between entities using optical machine readable images that addresses at least one of the identified problems in the current state of the art.

Currently, providing one entity with some control in how their personal financial information is provided to directly another entity involved in the funds transfer has so far been elusive. This inability to involve more entity control of the funds transfer transaction between entities while at the same time streamlining the amount of time and information entities must share with each other during funds transfer has effectively relegated experience in online electronic direct funds transfer to that of yesterday rather than the future. Contrary to current systems there is provided a system and method for coordinating processing of a funds transfer transaction between a transaction requestor and a transaction responder over a communications network. The transaction system comprises receiving a funds amount, requestor identification information, and responder identification information, such that at least one of the funds amount, the requestor identification information, or the responder identification information is encoded in symbology information embodied in a barcode. The system also decodes the symbology information into unencoded information using a coding scheme of the barcode and generates a funds transfer request for the funds transfer transaction, such that the funds transfer request has content including the funds amount and financial account information pertaining to at least one of the requestor identification information or the responder identification information, such that at least a portion of the content includes the unencoded information decoded from the symbology information. The system also sends the funds transfer request to a transaction processing system for subsequent settlement, as well as receives transaction confirmation messages.

A first aspect provided is a transaction system for coordinating processing of a funds transfer transaction between a transaction requestor and a transaction responder over a communications network, the transaction system comprising: a computer processor coupled to a memory, wherein the computer processor is programmed to coordinate processing of the funds transfer transaction by: receiving a funds amount, requestor identification information, and responder identification information, such that at least one of the funds amount, the requestor identification information, or the responder identification information is encoded in symbology information embodied in a barcode; decoding the symbology information into unencoded information using a coding scheme of the barcode; generating a funds transfer request for the funds transfer transaction, the funds transfer request having content including the funds amount and financial account information pertaining to at least one of the requestor identification information or the responder identification information, such that at least a portion of the content includes the unencoded information decoded from the symbology information; and sending the funds transfer request to a transaction processing system for subsequent settlement.

A second aspect provided is a method for coordinating processing of a funds transfer transaction between a transaction requestor and a transaction responder over a communications network, the method comprising: receiving a funds amount, requestor identification information, and responder identification information, such that at least one of the funds amount, the requestor identification information, or the responder identification information is encoded in symbology information embodied in a barcode; decoding, using a computer processor, the symbology information into unencoded information using a coding scheme of the barcode; generating, using the computer processor, a funds transfer request for the funds transfer transaction, the funds transfer request having content including the funds amount and financial account information pertaining to at least one of the requestor identification information or the responder identification information, such that at least a portion of the content includes the unencoded information decoded from the symbology information; and sending the funds transfer request to a transaction processing system for subsequent settlement.

A third aspect provided is a non-transitory computer readable storage medium with an executable program application stored thereon, the program application configured for coordinating processing of a funds transfer transaction involving a transaction requestor and a transaction responder, the program application configured as a client of a transaction service accessible over a communications network, wherein the program application instructs a computer processor to perform the following steps of: collecting a funds amount and requestor identification information, such that at least one of the funds amount or the requestor identification information is encoded in symbology information embodied in a barcode; receiving responder identification information including a financial account selected by the responder; generating a transaction request to have content of the funds amount, the requestor identification information, and the responder identification information, such that at least a portion of the content includes the encoded symbology information; sending a transaction request to the transaction service over the communications network; and receiving a transaction confirmation message including settlement information pertaining to the funds transfer transaction.

BRIEF DESCRIPTION OF THE DRAWINGS

Exemplary embodiments of the invention will now be described in conjunction with the following drawings, by way of example only, in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computer can be a mobile computing device having a processor for processing optical machine readable images (e.g. barcode images) and program code, a server computer having a processor for generating optical machine readable images based on invoice information and processing program code, an image sensor for capturing optical machine readable images, and at least one network interface for communicating payment transaction information and/or generated optical machine readable images. Program code may be executed by the processor to operate on input data, such as the captured optical machine readable images, to perform the functions described herein and generate output data representative of transaction data. Further, program code may be executed by the processor to operate on input data, such as a requested funds amount provided by funds requestor, to perform the functions described herein and generate output data as an optical machine readable image representing encoded funds amount data and other associated data.

Funds Transfer System 10

Figure 1:
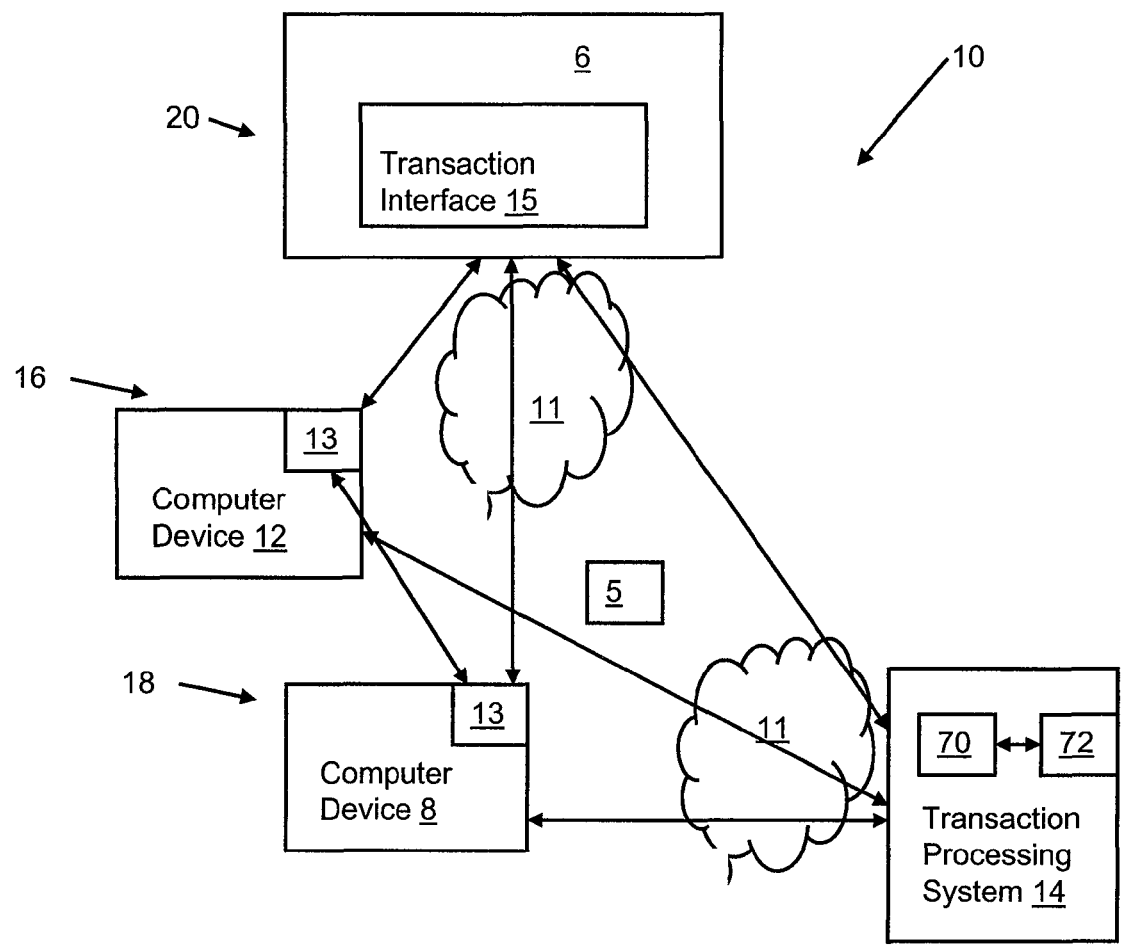
FIG. 1 is a block diagram of components of a funds transfer transaction system.

Referring to FIG. 1, shown is a funds transfer system 10 for completing an electronic funds transfer transaction 5 (e.g. an electronic transfer of money from one account to another) between a funds requestor 16 (e.g. an entity such as a seller) and a funds responder 18 (e.g. an entity such as a buyer). The funds requestor 16 has a financial account 70 with their financial institution (not shown) and the funds responder 18 has a financial account 72 with their financial institution (not shown), such that a funds transfer transaction service 20 coordinates settlement of the funds transfer transaction 5 between the financial accounts 70, 72 (as performed by a transaction processing system 14 such as but not limited to one or more financial institutions or transaction exchanges operating in conjunction or otherwise on behalf of the financial institutions at which the accounts 70,72 are held). For example, funds transfer transaction 5 can be an exchange of money (e.g. $5) as a result of goods or services changing hands between the funds requestor 16 and the funds responder 18 (e.g. buying a bicycle at a garage sale). An advantage of the funds transfer system 10, as further described below, is that the funds requestor 16 and the funds responder 18 do not have to expose their personal financial information with one another, including personal identifications numbers (PIN) and/or financial account passwords). The funds transfer transaction 5 involves the use of an optical machine readable image (OMRI) 200 that contains encoded transaction information, as further described below.

Referring again to FIG. 1, the funds requestor 16 operates a computer device 12 (having an installed payment application 13) and the funds responder 18 operates a computer device 8 (having an installed payment application 13), such that computer devices 8, 12 can be in communication with one another and with a funds transfer transaction service 20 (having an installed transaction interface 15) via a communications network 11. The communications network 11 can be a one or more networks, for example such as but not limited to: the Internet; an extranet; and/or an intranet. Further, the communications network 11 can be a wired or wireless network. It is also recognized that network 11 messages (between the various devices 6, 8,10 and system 14) can be communicated via short range wireless communication protocols such as but not limited to Bluetooth™, infrared (IR), radio frequency (RF), near field communication (NFC) and/or by long range communication protocols (e.g. HTTP, HTTPS, etc.), in view of the type of electronic communication required between any pair of devices 6,8,12 and system 14. For example, devices 8,12 could communicate with one another using short range Bluetooth™ communications while devices 6,8 could communicate with one another using long range HTTPS based communications.

It is recognized that network 11 communication messages facilitating the processing of the funds transfer transaction 5 are preferably between each of the payment applications 13 and the transaction interface 15, rather than directly between the payment applications 13 themselves (i.e. directly meaning without interaction with the transaction interface 15). Therefore, in one embodiment, in the event that the payment applications 13 need (e.g. request) information from one another, these request (and response) network 11 messages would go through the transaction interface 15 acting as an intermediary network interface between the payment applications 13. However, it is recognized that network 11 messaging directly between the payment applications 13 can also be configured, for example for the purpose of gathering information relevant to generation and/or processing of the funds transfer transaction 5 as desired.

Further, the transaction service 20 can communicate also via the communications network 11 with a transaction processing system 14 that performs the settlement (e.g. debit of funds specified in the funds transfer transaction 5 from the account 72 and crediting of the funds in to the account 70) of the funds transfer transaction 5 between the financial accounts 70, 72. It is recognized that the actual amount of debit and credit funds actions performed by the transaction processing system 14 may not exactly match a funds amount 203 (see FIG. 3) specified in the funds transfer transaction 5, for example as embodied in the OMRI 200 such as a barcode, due to applied service charges. For example, a payment request of $5 from the financial account 72 to the financial account 70 could result in an actual debited amount of $5.02 (representing an included $0.02 service charge to the funds requestor 16) and/or an actual credited amount of $4.98 (representing an included $0.02 service charge to the funds responder 16).

Therefore, it is anticipated that processing of the electronic funds transfer transaction 5 by the funds transfer system 10 can involve a transaction service charge being charged to the funds requestor 16 and/or the funds responder 18 in order to complete the funds transfer transaction 5 initiated by the funds requestor 16. Transaction 5 settlement can be defined as where the funds amount is transferred from the one account 70 to the other account 72, i.e. the credit and debit transactions of the funds amount against the respective accounts 70,72 are either performed (e.g. in real time) or promised to be performed (e.g. included in a batch transaction to be performed later in the day or following business day).

Referring again to FIG. 1, the computer devices 8, 12 can each have a payment application 13 that operates as a client of the transaction service 20, such that at least the payment application 13 of the computer device 12 (of the funds requestor 16) is registered with the transaction service 20. Registration details 17 (see FIG. 4) of the funds requestor 16 with the transaction service 20 can include requestor data such as but not limited to: identification ID 80 (e.g. Mobile Subscriber Integrated Services Digital Network Number (MSISDN) as a telephone number, a unique identifier—different from the phone number—called the International Mobile Equipment Identity (IMEI), a universally unique identifier (UUID) such as a MAC address or other implemented generation scheme for the UUID) of the computer device 12; requestor ID 82 that is or is otherwise associated (mapped, linked) to the actual account number 70 of the funds requestor 16; and a unique encryption key 84 that is assigned to the funds requestor 16.

Optionally, the funds responder 18 can also be registered with the transaction service 20 and have registration details 17 including one or more responder data such as but not limited to: identification ID 80 (e.g. Mobile Subscriber Integrated Services Digital Network Number (MSISDN) as a telephone number, a unique identifier—different from the phone number—called the International Mobile Equipment Identity (IMEI), a universally unique identifier (UUID) such as a MAC address or other implemented generation scheme for the UUID) of the computer device 8; responder ID 82 that is or is otherwise associated (mapped, linked) to the actual account number 72 of the funds responder 18; and a unique encryption key 84 that is assigned to the funds responder 18.

It is recognized that in view of the above, any of the registration details 17 (of the funds requestor 16 and/or the funds responder 18) can be included in the funds transfer transaction 5 received by the transaction service 20. Further, it is recognized that any of the registration details 17 (of the funds requestor 16 and/or the funds responder 18) can be incorporated in to the OMRI 200 used to facilitate the funds transfer transaction 5, as further described below.

The transaction service 20 is implemented on a computer device 6 (e.g. a web server) and communicates over the communications network 11 with the computer devices 8,12 via a hosted transaction interface 15. The transaction interface 15 of the transaction service 20 can be a web site accessible over the communications network 11 by the computer devices 8,12 using respective web browsers operating on the computer devices 8,12, such that the transaction interface 15 is in communication with the payment applications 13 of the client devices 8,12. Accordingly, the transaction interface 15, computer device 12 and computer device 8 can interact (e.g. via network 11 messages) together to initiate and complete the funds transfer transaction 5, for example based on products offered and sold by the funds requestor 16 to the funds responder 18, such that the OMRI 200 (see FIG. 3) is generated and included as part of the initiation and/or processing of the funds transfer transaction 5 in conjunction with the order interface 15.

The OMRI 200 (i.e. an optical machine-readable representation of data) of the funds transfer transaction 5 contains symbology information 204 in encoded form based on a coding scheme 209. One example of the OMRI 200 is a barcode, such that the coding scheme 209 is a barcode coding scheme for use in encoding and decoding of the symbology information 204 of the barcode. Another example of the OMRI 200 is a dataglyph, such that the coding scheme 209 is a dataglyph coding scheme for use in encoding and decoding of the symbology information 204 of the dataglyph.

The OMRI 200 is used by the funds transfer system 10 to represent and facilitate processing of the funds transfer transaction 5 by representing textual information 201 (e.g. product pricing numbers, total funds amount 203 numbers, funds responder 18 and/or funds requestor 16 identification or account 70, 72 numbers, a transaction number identifying the funds transfer transaction 5, product descriptions and/or transfer terms including password or PIN information corresponding to the account 70 and/or the account 72, etc.) that is encoded as symbology information 204 in the OMRI 200. It is recognized that the funds transfer transaction 5 can be initiated by the funds requestor 16 representing a seller of a product (e.g. a good or service provided by the seller to the buyer) or could be initiated by the funds requestor 16 representing the buyer of a product in the case where the buyer makes an unsolicited offer/bid for an available product (of a potential seller). Another example is where a debt is owed by a debtor to a creditor (e.g. $5 borrowed by a friend), whereby the funds requestor 16 could be the creditor requesting that the debtor pay back the debt or could be the debtor offering payment of the debt unsolicited by the creditor. In the above-described cases, it is recognized that the funds requestor 16 is the entity initiating the funds transfer transaction 5 and could be either the debit account 70,72 holder or the credit account holder 70,72, depending upon the circumstance. This is in comparison to the funds responder 18 who is the entity receiving the OMRI 200 and causing the funds transfer transaction 5 to proceed to settlement via the transaction service 20 and the transaction processing system 14.

As discussed below, the computer device 8 does not necessarily have to communicate with the computer device 12 over the communications network 11, in order to receive the OMRI 200. Instead, the funds responder 18 can record an image of the OMRI 200 by using an imager of the computer device 8 (e.g. a camera 118 enabled mobile device—see FIG. 5), for subsequent processing by the computer device 8 and the transaction service 20. In this example, the user interface 104 (see FIG. 5) of the computer device 12 can display the OMRI 200 within range of the camera 118 of the computer device 8 for subsequent receipt as a recorded image.

Definition of Products

In economics, economic output is divided into goods and services. When an economic activity yields a valuable or useful thing, it can be known as production output of the totality of products (e.g. goods or services) in an economy that is made available for use by someone else. Products as goods can range from a simple safety pin, food, clothing, computer components to complex machinery and electronic or physical media (physical or electronic versions of music, print media, etc.). Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The entity providing the products can be a businessperson or individual engaged in wholesale/retail trade, an organization, an administration, and/or a business that sells, administers, maintains, charges for or otherwise makes available product(s) that are desirable by their customer. Accordingly, the entity providing (e.g. selling) the product can be one person, or an association of persons, for the purpose of carrying on some enterprise or business; a corporation; a firm; etc.

Further, it is recognized that the products can be related to company activities not related to specific product(s), for example customer service, community activities, donations, and/or sponsorships. These general activities of the entity providing the product are also considered as part of the definition of products. As discussed above, the exchanged funds can be as a result of payment of a debt by a debtor to a creditor, hence in this case the product is a loan of funds between the debtor and creditor. A further related example is where the exchanged funds can be as a result of loaning a sum of money (i.e. creating a debt) between the debtor and the creditor. Also as discussed above, the debtor and/or creditors can be entities embodied as individuals (e.g. a person), companies (e.g. banks), etc. Further, it is recognized that the products can include restaurant meals (and/or service), such that the funds transfer transaction 5 represents a meal bill and the products are individual food and/or beverage items. It is also recognized that the products can be groceries or other retail items being paid for in person by the funds responder 18 at a merchant retail establishment (e.g. the funds requestor), for example.

As further discussed, the funds amount 203 of the funds transfer transaction 5 is entered via the payment application 13 of the requestor computer device 12. The payment application 13 provides the funds requestor 16 with the ability to select and/or specify the funds amount 203 and can also generate the OMRI 200 (see FIG. 3) that contains encoded funds transfer information (the symbology information 204) representing summary information (e.g. optional product listing/description, transfer identification information, requestor ID, and/or funds amount 203, etc.). It is also recognized that the funds transfer transaction 5 can represent a plurality of products, e.g. one OMRI 200 representing funds amount 203 data for two or more products.

In any event, it is recognized that the OMRI 200 can be generated by the payment application 13 of the computer device 12 (i.e. the computer device of the entity initiating the funds transfer request) to contain data (e.g. the funds amount data 203 and any associated data including requestor data 208, responder data 211 and/or transfer data 210) of the funds transfer transaction 5, including transaction data needed by the transaction service 20 in order to coordinate the settlement of the funds transfer transaction 5 via the payment processing system 14 (i.e. transferring funds from one specified account 70,72 to another specified account 70,72). It should be noted that the actual generation of the barcode 200 can alternatively be performed by the transaction service 20 upon request, as further described below.

OMRI 200

Figure 3:
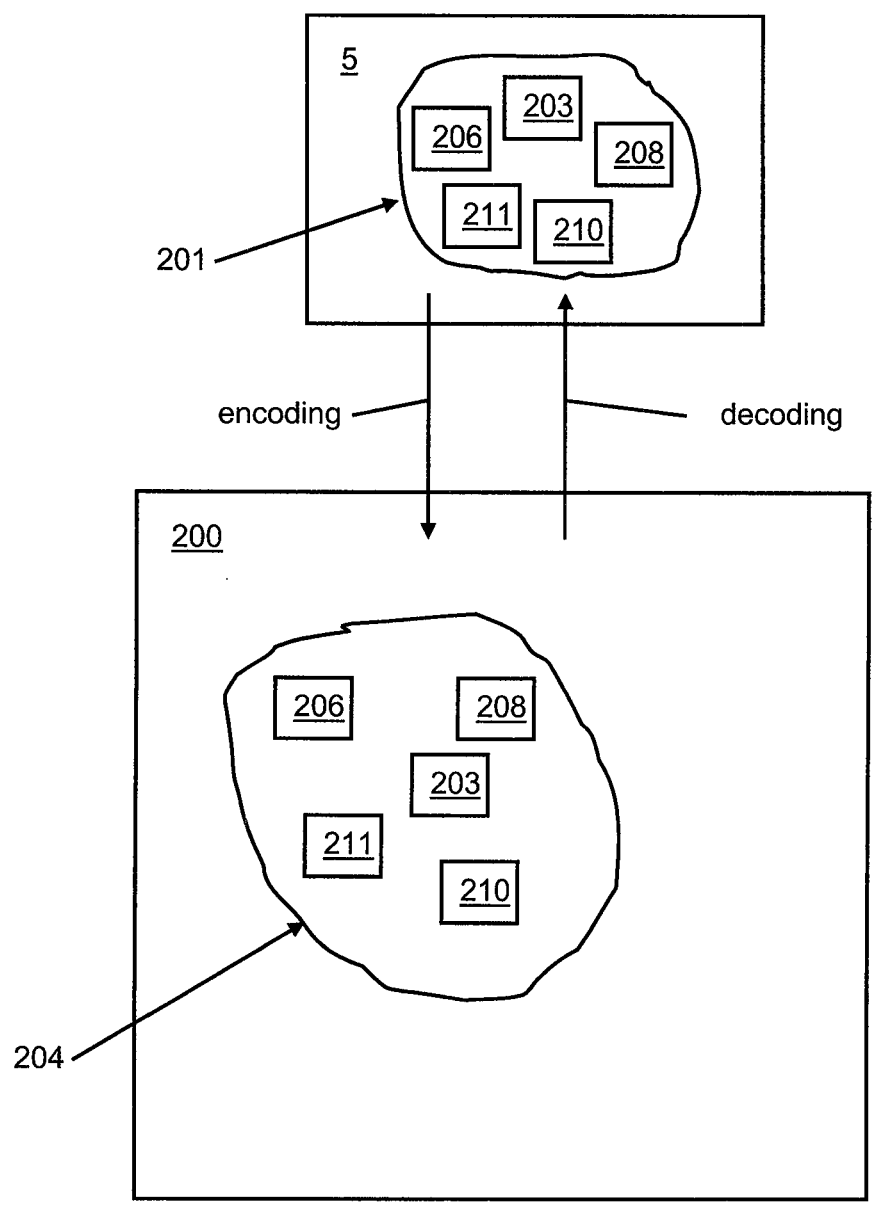
FIG. 3 shows example encoded and unencoded information for the system of FIG. 1.

Referring to FIG. 3, as used herein, the term OMRI 200 (e.g. barcode, dataglyph, etc.) refers to an optical machine-readable representation of encoded information or data, presented as an ordered pattern of symbols (i.e. symbology information 204). For example, barcodes can encode information in the widths and the spacing of parallel lines, and may be referred to as linear or 1D (1 dimensional) symbologies. Barcodes can also encode information in patterns of squares, dots, hexagons and other geometric shapes or symbols within images termed 2D (2 dimensional) matrix codes or symbologies. Typically, although 2D systems use symbols other than bars, they are generally referred to as barcodes as well. Accordingly, barcode images discussed herein for use with a barcode encoder or decoder can refer to either 1D or 2D barcodes. With conventional monochromatic barcodes, features are typically printed in black on a white background, thereby forming a pattern that is used to form the machine-readable representation of funds information of the funds transfer transaction 5. With color barcodes, the pattern can include any number of colors (typically also including black and white) distinguishable from one another during the barcode decoding process.

The OMRI 200 is generated to include symbology information 204 representing funds transfer transaction 5 content used to define product (optional) and funds payment terms/details concerning the specified funds amount 203. As discussed further below, the OMRI 200 can be electronically displayed (e.g. on a computer display), can be provided as graphic content (e.g. an image file such as but not limited to a GIF or JPEG) in a network message and/or can be provided in printed form (e.g. presented on a physical medium such as paper or plastic—for example presented on a label). As discussed, interaction between the OMRI 200 and the funds responder 18 (see FIG. 1) can include funds responder 18 actions such as but not limited to: selection (e.g. via mouse or other pointer) on a user interface 104 (see FIG. 5) of the computer device 8 displaying the OMRI 200; receiving an image file containing the OMRI 200; and/or recording/capturing the image of the OMRI 200 using an imager 118 (e.g. camera) of the computer device 8,12 (e.g. mobile device), such that the OMRI 200 is displayed on physical media and/or electronic media (i.e. an electronic display adjacent to the customer device 8 and in-range of the imager 118). Example environments of the described image capture process would be where the OMRI 200 is displayed on the computer device 12 of the funds requestor 16.

In terms of the symbology information 204 of the OMRI 200, the symbology information 204 includes a plurality of symbols (i.e. graphical elements) that, as a collection of symbols or patterns (e.g. an organized collection of symbols forms a legend, or key), represents encoded funds information that is distinct from the actual unencoded textual funds information 201 itself. For example, a graphical element (of the symbology 204) of a black line of a specific width represents a textual element (of the textual information 201) as the number six, while a different width represents a different textual element (of the textual information 201) such as the number two. It is recognized that graphical elements can be pictures (e.g. images) of text elements and/or of non-text elements. For example, the graphical element "6" (e.g. encoded or symbology information 204) in the coding scheme 209 could be mapped to a product code "1234" (e.g. unencoded information 201). In another example, the graphical element "(*)" (e.g. encoded or symbology information 204) in the coding scheme 209 could be mapped to a product code "1234" (e.g. unencoded information 201).

The purpose of the symbology information 204 is to communicate encoded funds information (that defines a plurality of funds parameters) as readable (e.g. decodable) by an image decoder 119 or otherwise encodable by an image encoder 120. The decoder 119 could be present on the computer devices 8,12 and/or on the transaction service 20, as further described below. It is recognized that mapping (i.e. processing performed by the decoder 119 or encoder 120) between the symbology information 204 and the textual funds information 201 is what enables the OMRI 200 to be generated and interpreted. A specification of the symbology information 204 can include the encoding of the single digits/characters of the textual funds data 201 as well as the start and stop markers into individual symbols (e.g. bars) and space between the symbols of the symbol collection/pattern, the size of a quiet zone required to be before and after the OMRI 200, as well as a computation of a checksum incorporated into the OMRI 200 for error checking purposes as is known in the art.

It is recognized that the OMRI 200 may not contain descriptive data, rather the OMRI 200 can be used as reference codes (e.g. decoded information) that a computer uses to look up an associated record that contains the descriptive textual funds data 201, as well as any other relevant information about the funds amount 203 associated with the textual funds data 201 encoded in the OMRI 200. For example, the matching item record of the symbology information 204 can contain an optional description of the product, requestor and/or responder name, funds amount, requestor or responder financial account information or designations, etc., including any of the product data 206, requestor data 208, responder data 211 and/or transfer data 210 as further described below. However, some OMRI 200 can contain, besides reference ID, additional or supplemental information such as product name or manufacturer, for example, and some 2D OMRI 200 may contain even more information as they can be more informationally dense due the greater variation potential of the printed patterns over those of 1D OMRI 200.

In terms of different barcode type, linear symbologies (e.g. UPC barcodes as an example symbology format of the barcode) can be classified mainly by two properties, continuous vs. discrete and two-width vs. many-width. In continuous vs. discrete, characters (i.e. representing the invoice data content) in continuous symbologies usually abut, with one character ending with a space and the next beginning with a bar (e.g. light-dark patterns), or vice versa. Characters (i.e. representing the invoice data content) in discrete symbologies begin and end with bars and any intercharacter space is ignored as long as it is not wide enough to look like the code ends. In two-width vs. many-width, bars and spaces in two-width symbologies are wide or narrow, and the exact width of a wide bar has no significance as long as the symbology requirements for wide bars are adhered to (usually two to three times wider than a narrow bar). Bars and spaces in many-width symbologies are all multiples of a basic width called the module, wherein most such codes use four widths of 1, 2, 3 and 4 modules. Some linear symbologies use interleaving, such that the first character (i.e. representing the invoice data content) is encoded using black bars of varying width. The second character (i.e. representing the invoice data content) is then encoded, by varying the width of the white spaces between these bars. Thus characters (i.e. representing the invoice data content) are encoded in pairs over the same section of the barcode. Stacked symbologies repeat a given linear symbology vertically.

In terms of multidimensional symbologies (e.g. 2D, 3D, etc.), the most common among the many 2D symbologies are matrix codes, which feature square or dot-shaped modules (i.e. representing the invoice data content) arranged on a grid pattern. 2-D symbologies also come in circular and other patterns and may employ steganography, thereby hiding modules within an image (for example, using DataGlyphs). Aztec Code is another type of 2D barcode.

Quick Response Codes (QRC) are another a type of matrix barcode (or two-dimensional code) providing faster readability and larger storage capacity compared to traditional UPC barcodes. The QR code (as an example symbology format of the barcode) consists of black modules arranged in a square pattern on a white background. The information encoded can be made up of four standardized kinds ("modes") of encoded data (e.g. numeric, alphanumeric, byte/binary, and/or Kanji), or by supported extensions virtually any kind of data.

It is also recognized that the symbology information 204 of the OMRI 200 can include custom graphical elements (as codified in the coding scheme 209) involving combinations of one or more graphical elements used to represent a textual element, e.g. a corporate logo is used as a collection of graphical elements (e.g. circle, square, and company name) that is mapped (e.g. decoded) by the coding scheme 209 to represent a textual element (e.g. a URL to a webpage of the company website). Alternatively, the textual element can be mapped (e.g. encoded) by the coding scheme 209 to represent the collection of graphical elements. In this example, the graphical element of a company name (the symbology information 204) is decoded by the coding scheme 209 to represent the text of the URL (the textual information 201). One example of barcodes containing custom graphical elements is Microsoft™ Tag barcodes.

Microsoft™ Tags as an OMRI 200 are another type of barcode, e.g. 2D barcodes, which offer more flexibility than traditional barcode formats both in the barcode design and the content behind it. Because Microsoft Tag barcodes can be linked to data stored on a server, you can deliver a more robust online experience—including entire mobile sites—and update the content any time without having to change the Microsoft Tag. So, if you link a Microsoft Tag on your business card to your résumé, it will still be valid after you get that big promotion. Microsoft Tags can be black-and-white or full-color, including custom images (e.g., a company logo). Therefore, the Microsoft Tag can have encoded data in the symbology information 204 of the Tag that includes a link (e.g. URL) or other hyperlink that references a location in memory (e.g. in a database) and/or a network address where data content is available/accessible via the encoded link. In other words, a Tag encoder would use a Tag coding scheme 209 to encode the textual link information 201 into corresponding symbology information 204, e.g. the hyperlink to a website (the textual link information 201) would be represented as one or more graphical elements such as a company logo or even graphical elements (the symbology information 204) picturing the product itself.

It is also recognized that the symbology information 204 of the OMRI 200 can be encrypted (e.g. using a DES algorithm). In terms of the format of the symbology information 204, codewords embedded/encoded in the symbology information 204 are typically 8 bits long. It is recognized that the funds transfer transaction 5 data represented by the symbology information 204 in the OMRI 200 can be broken up into multiple blocks, such that each block includes a number (e.g. 255) of codewords in length.

Another example of an optical machine-readable (e.g. OMRI 200) representation of encoded information or data are DataGlyphs, which are a new technology for encoding machine readable data onto paper documents or other physical media. They encode information into a number of tiny, individual glyph elements. Each graphical (e.g. glyph) element can consist of a small 45 degree diagonal line as short as 1/100th of an inch or less, depending on the resolution of the printing and scanning that is used, for example. Each glyph element (as the symbology information 204) represents a single binary 0 or 1 (as the decoded textual information 201), depending on whether it slopes to the left or right. Sequences of these glyph elements (symbology information 204) can be used to encode numeric, textual or other information (unencoded information 201).

As an example configuration of the dataglyph symbology and coding scheme 209, the individual glyphs are grouped together on the page (or displayed electronically on a display), where they form unobtrusive, evenly textured gray areas, like half-toned pictures. One of the reasons for using diagonal glyph elements is because research has shown that the patterns that they form when massed together are not visually distracting. DataGlyph technology allows ordinary business documents to carry thousands of characters of information hidden in these unobtrusive gray patterns that can appear as backgrounds, shading patterns or conventional graphic design elements. Often, their presence will go completely unnoticed. (The entire Gettysburg Address will fit in a DataGlyph about the size of a small US postage stamp). DataGlyph areas can be printed on a document as part of its normal printing process or displayed on a screen as part of the normal image rendering process. The information to be put in the DataGlyphs is encoded as a sequence of individual glyphs, and these can be printed either directly by the encoding software (for instance, by computer laser printer) or via a conventional printing process, such as offset. The glyphs are laid down on a finely spaced rectangular grid so that the area is evenly textured. In addition, each glyph area contains an embedded synchronization lattice or "skeleton"—a repeating, fixed pattern of glyphs which marks the boundaries of the glyph area and serves as a clocking track to improve the reliability of reading. Before data is placed into the synchronization frame, it's grouped into blocks of a few dozen bytes and error correcting code is added to each block. The amount of error correction to be used is chosen by the application, depending on the expected quality of the print-scan cycle. Higher levels of error correction increase the size of the glyph area needed for a given amount of data, but improve the reliability with which the data can be read back. This can be very important in environments where there's a high level of image noise (for example, fax) or where the documents are subjected to rough handling. As a final step, the bytes of data are randomly dispersed across the glyph area, so that if any part of the glyph area on the paper is severely damaged, the damage to any individual block of data will be slight, and thus easy for the error correcting code to recover. Together, error correction and randomization provide very high levels of reliability, even when the glyph area is impaired by ink marks, staples and other kinds of image damage.

In view of the above description, it is recognized that OMRI 200 can be embodied as barcodes, dataglyphs or other images that contain encoded symbology information 204 that can be decoded into unencoded information 201 (e.g. textual elements) using an appropriate coding scheme 209 that provides a mapping (e.g. rules) between the symbology information 204 to into the unencoded information 201 (e.g. the decoding process) and the unencoded information 201 into the symbology information 204 (e.g. the encoding process). In any event, the following description, for simplified example explanation purposes only, refers to OMRI 200 as barcodes 200. However, it is recognized that in the below description, the term barcode 200 can be interchanged with the broader meaning of OMRI 200, as desired.

Payment Application 13

Referring to FIG. 1, it is recognized that the payment application 13 can include a plurality of barcode 200 related processing functionality, a plurality of transaction processing functionality and/or client functionality configured for network 11 communication with a transaction interface 15 in a client-server relationship. For example, the payment application 13 can be configured as a thin client of the transaction interface 15, such that the payment application 13 is configured to interact with a barcode processing system of the transaction interface 15 via a series of web pages generated by the barcode processing system, sent via network messages and displayed on the user interface 104. Accordingly, the payment application 13 would interact with a web browser (or other network communication program) to send and receive the messages via the network 11 containing transaction 5 specific information, i.e. to display the web pages on the user interface 104 including output data for the transaction 5 and to coordinate the entry of input data on the user interface 104 and network transmission of the input data for the transaction 5.

Alternatively, the payment application 13 can be configured as a thick client of the transaction interface 15, such that the payment application 13 is provisioned with transaction and/or barcode processing functionality similar to (or at least a portion of) that functionality of the barcode processing system and/or barcode generation system of the transaction interface 15, as further described below. It is recognized that the thick client version of the payment application 13 could be configured to perform some of the transaction or barcode processing on behalf of or otherwise in substitution of any of the processing functionality of the barcode processing system and/or the barcode generation system implemented by the of the transaction interface 15 during processing of the transaction 5. It is also recognized that the thick client version of the payment application 13 could also be configured to communicate over the network 11 via a series of web pages as generated or otherwise received by the of the transaction interface 15, sent as network messages between the computer devices 8,12 and the transaction interface 15.

Figure 2:
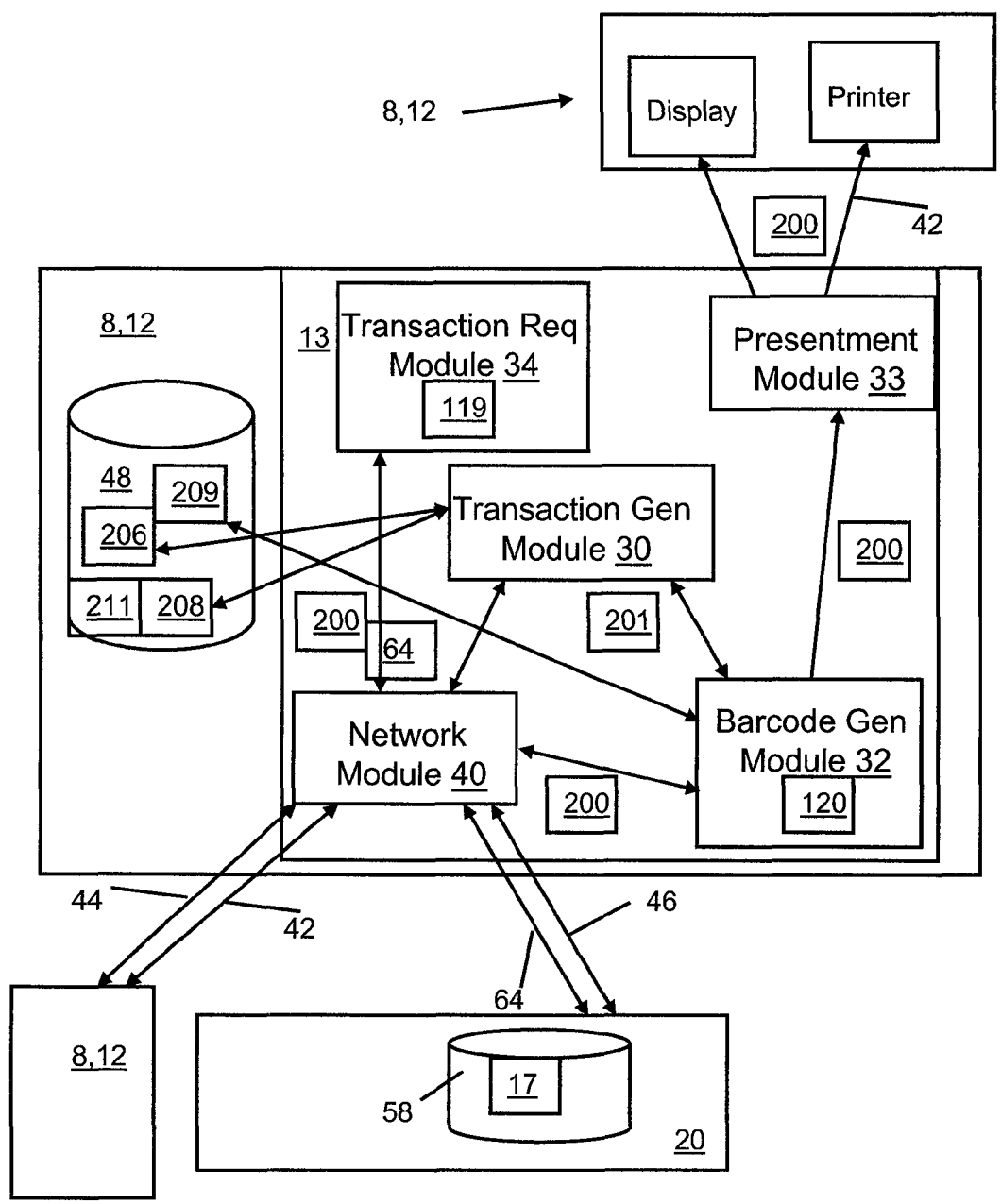
FIG. 2 is a block diagram of a payment application of the system of FIG. 1.

Referring to FIGS. 1 and 2, the payment application 13 can be configured as a client application of the transaction service 20, is configured for generation (i.e. encoding) and presentment of the barcode 200 to the funds responder 18, and/or is configured for processing (i.e. decoding) of the presented barcode 200 and generation of a funds transaction request 64 to the transaction service 20. The payment application 13 is also configured to provide a graphical interface (on the user interface 104—see FIG. 5), for example, to facilitate entry of requestor account information by the funds requestor 16 as well as entry of the funds amount 203 requested (e.g. via a transaction generation module 30). The payment application 13 is also configured to provide a graphical interface, for example, to facilitate entry of responder account information by the funds responder 18 as well as entry of a confirmation that the funds amount 203 requested is correct. It is recognized that the functionality of the payment application 13, encountered by a user during the funds transfer transaction 5, is dependent upon which side the computer device 8,12 is being utilized for, i.e. either the funds requestor 16 or the funds responder 18.

Referring to FIG. 2, shown is an example configuration of the payment application 13 that can include a network communications module 40 for communicating (e.g. sending or receiving) fund request messages 42 between the computer devices 8,12 and for communicating (e.g. sending or receiving) fund response messages 44 between the computer devices 8,12 over the communications network 11. The network communications module 40 is also configured for sending a transaction request 64 (e.g. a request by the funds responder 18 containing the appropriate transaction data of the funds amount 203 and both for the funds requestor 16 and the funds responder 18, to allow to the transaction system 20 to coordinate the actual funds transfer between accounts 70,72) as well as receiving transaction confirmation messages 46 from the transaction service 20 (containing information indicating that the appropriate account 70,72 has been credited or debited as the case warrants).

The requestor confirmation message(s) 46 received by the payment application 13 could contain details of the payment processing including that the requestor account was (or will be) credited/debited by the funds amount 203 of the funds transfer transaction 5, as well as any transfer data 210 (see FIG. 3) identifying the funds transfer transaction 5 (e.g. transfer ID, responder ID, description of the products, etc.) for requestor accounting records. It is recognized that the payment application 13 would could also receive responder confirmation message(s) 46 containing details of the payment processing including that the responder account was (or will be) debited by the funds amount 203 of the funds transfer transaction 5, as well as any transfer data 210 identifying the funds transfer transaction 5 (e.g. transfer ID, requester ID, description of the products, etc.) for responder accounting records.

In order to facilitate description of the different requestor and responder based functionality of the payment application 13, the following is presented as combined functional descriptions (i.e. requestor and responder) of the payment application 13 by example only, in reference to the same FIG. 2, as both requestor and responder functionalities could be included in one payment application 13. It is also envisioned that the payment application 13 could be configured on the computer devices 8,12 as two separate applications, whereby a requestor version of the payment application 13 could be used by the computer 12 and a corresponding responder version of the payment application 13 could be used by the computer 8, in the example where the computer 12 is used for requestor based actions (e.g. message send, message receive, processing) and the computer 8 is used for responder based actions (e.g. message send, message receive, processing). In the case where requestor based actions are required of the computer 8, then the requestor version of the payment application 13 could be used and in the case where responder based actions are required of the computer 12, then the responder version of the payment application 13 could be used, for example.

The network communications module 40 can also be configured to send and receive the transaction confirmation messages 46 over the communications network 11 with respect to the transaction service 20. Also included is a database 48 containing any optional product data 206 (e.g. product descriptions, product availability, etc.), requestor data 208 (e.g. requestor bank account number, a unique requestor reference ID of the requestor assigned by the transaction service 20 (e.g. via the registration module 60—see FIG. 4), tax or requestor business registration details, and registration details 17 of the requestor), responder data 211 (e.g. responder bank account number, a unique responder reference ID of the responder assigned by the transaction service 20 (e.g. via the registration module 60—see FIG. 4), tax or responder business registration details, and registration details 17 of the responder) and network 11 address information of the transaction service 20. It is recognize that preferably the payment application 13 of the funds requestor 16 does not have access to sensitive responder data 211 (e.g. PIN numbers and/or actual bank account numbers) and preferably the payment application 13 of the funds responder 18 does not have access to sensitive requestor data 208 (e.g. PIN numbers and/or actual bank account numbers).

The database 48 can also have customized barcode definitions of a customized coding scheme 209 containing relationships (e.g. rules) between machine readable symbology and codewords used to encode (or decode) funds transfer transaction 5 information during generation of the barcode 200 used to represent the funds transfer transaction 5. For example, the customized coding scheme 209 can be used to encode (i.e. translate) text based funds information 201 (see FIG. 3) of the funds transfer transaction 5 into symbology information 204, performed during generation of the barcode 200 (e.g. by the computer device 12 and/or the transaction service 20). The customized coding scheme 209 can also be used to decode (i.e. interpret) symbology information 204 present in the barcode 200 into text based funds information 201 of the funds transfer transaction 5 during processing of the barcode 200 (e.g. by the computer device 8 and/or the transaction service 20). It is recognized that the customized coding scheme 209 can be known to the transaction service 20 and can include customized codewords pertaining to specific funds information such as but not limited to: registration details 17 of the requestor and/or responder, requestor ID, responder ID; funds amounts 203; transfer number(s); etc.

Referring again to FIG. 2, the payment application 13 also has a transaction generation module 30 used to collect the funds transaction transfer 5 data (e.g. product data 206, requestor data 208, responder data 211 and/or transfer data 210) associated with the funds amount 203 selected/entered by the funds requestor 16 during initiation of the funds transaction transfer 5. It is recognized that optional product data 206 and some of the responder data 211 of the funds transaction transfer 5, such as specific products ordered and quantity of each product, could be provided to the transaction generation module 30 obtained from funds request messages 44 (e.g. via the network communications module 40). Further, the transaction generation module 30 would collect (or otherwise receive) the requestor data 208 for the funds transaction transfer 5 from the database 48. The transaction generation module 30 also generates the funds transaction transfer 5 data including the funds amount 203 (optionally including applicable taxes) that includes the total funds amount owed (for example) by the funds responder 18 and requestor identification information (associated with or otherwise embodying the requestor bank account information) of the funds transaction transfer 5. For example, in terms of the requestor bank account information, this could be supplied as part of the requestor information included in the funds transaction transfer 5 data or this could be supplied as a requestor identification information (e.g. requestor ID) used by the transaction service 20 to lookup the actual requestor bank account information known to the transaction service 20 (e.g. via the registration module 60—see FIG. 4) and therefore abstracted from the funds responder 18.

It is recognized that the transaction generation module 30 could also be configured to provide to the user of the computer device 12 (via a presented graphical user interface on the user interface 104 of the computer device 12) the ability to select or otherwise enter the desired requestor account (e.g. specifying a credit card number, a debit card number, or any other account information for use in accepting/paying the funds amount 203). The transaction generation module 30 could also provide, via the graphical user interface, the ability of the funds requestor 16 to enter their PIN (or other password information specific to accessing their financial accounts directly) associated with the specified requestor account, thereby indicating that the user of the computer device 12 at the time of generating the transaction and resultant barcode 200 has the authority to authorize the transaction service 20 (e.g. via the transfer processing module 65) to coordinate funds transfer involving the specified requestor account. The PIN, or other password information specific to accessing the selected financial accounts directly, can be considered as part of the requestor data 208 included in the funds transaction transfer 5 data and included in the symbology information 204, either directly or otherwise abstracted during generation of the barcode 200. For example, the PIN or other password information would not be the actual PIN or password information made available to the financial institutions of the accounts 70,72, rather would be reference information used by the transaction service 20 (e.g. via the registration module 60) to look up the actual PIN or password information stored in the registration details 17 of the funds requestor 16 using the reference PIN or password provided by the funds requestor 16 during generation of the barcode 200.

This use of PIN or password information is advantageous, in addition to any passwords required to access the computer device 12 in general (e.g. device login) and/or login to the payment application 13 specifically, as the owner of the computer device 12 would not want any unauthorized access to their financial accounts to occur. It is also envisioned that the entered PIN or password information could be done by the user in order to login to the payment application 13 itself (i.e. access the functionality of the payment application 13 provisioned on the computer device 12). It is also recognized that the user of the computer device 12 may wish to have separate PINs or passwords associated with each account accessible through the payment application 13 itself (e.g. selectable) and/or known to the transaction service 20 (e.g. via the registration module 60) via the registration details 17, in addition to a general login (including password) to the computer device 12 and/or payment application in general.

The payment application 13 also has a barcode generation module 32, including an encoder 120, that is configured to use the available/collected funds transaction transfer 5 data and the customized coding scheme 209 to generate the barcode 200. It is recognized that the barcode 200 is generated by the barcode generation module 32 to contain data of the funds transaction transfer 5 pertaining to the funds amount 203 entered/selected by the funds requestor 16, including payment transaction data needed by the transaction service 20 to coordinate settlement of the financial transaction (associated with the funds transaction transfer 5 data) via the transaction processing system 14 in transferring funds from the specified (e.g. by the transaction service 14) account of the funds responder 18 to the specified (e.g. by the transaction service 20) account of the funds requestor 16. In this example, it is envisioned that the funds requestor 16 is preregistered (i.e. has provided the registration details 17) with the transaction service 20 and is provided with a requestor ID (e.g. via the registration module 60) that is associated with the requestor's actual account information (and any other sensitive requestor information), both of which are stored in a secure database 58 of the transaction service 20 (thereby providing for the lookup by the registration module 60).

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the barcode 200 are unique identifiers representing the particular standard code and custom code (representing invoice specific data) defined in the customized coding scheme 209 that, when read by the barcode decoder 119 or encoder 120, can be used to look up additional information about the invoice item associated with the barcode 200. For example, the funds amount 203, and optional description, of the product would be encoded in the barcode 200 using the symbology information 204.

Accordingly, the barcode generation module 32 takes the funds transfer transaction 5 data (i.e. as the textual funds information 201) and uses the codes and associated rules of the customized coding interpretation scheme 209 to convert a piece of the textual funds information 201 (for example, a letter, word, phrase, etc.) of the funds transfer transaction 5 data into another form or representation (one sign into another sign), not necessarily of the same type, i.e. the symbology information 204. In information processing performed by the barcode generation module 32, encoding is the process by which textual funds information 201 of the funds transfer transaction 5 is converted into symbols (of the symbol format 204 defined by the customized coding scheme 209) to be communicated/presented. Decoding is the reverse process, converting these code symbols 204 back into textual funds information 201 understandable by a receiver. Therefore, the symbology information 204 generated from the textual funds information 201 of the funds transfer transaction 5 data is used by the barcode generation module 32 to construct the barcode 200, according to the customized coding scheme 209. This barcode 200 can be made available to the network communications module 40 to be sent in the request message 42 (delivered as an image file for example) to the computer device 8 or can be displayed on a browser screen of the user interface 104 of the computer device 12. It is recognized that the barcode 200 represents symbolically the textual data 201 of the funds transfer transaction 5.

Referring again to FIG. 2, the payment application 13 also has a barcode presentment module 33, used by the funds requestor 16 to transmit via request messages 42 and/or electronically display the image of the barcode 200 to the funds responder 18 on the display (of the user interface 104) of the computer device 12. Therefore, in addition to using the request messages 42, the barcode presentment module 33 can be configured to provide instructions to a printer for physically printing the barcode 200 and/or can be configured to provide instructions to the electronic display for displaying the barcode 200. In either case, the barcode presentment module 33 is configured to present the barcode 200 to the funds responder 18 for subsequent receipt or image capture (of the barcode 200) using the responder's computer device 8 (e.g. mobile device).

Referring to FIG. 2, the payment application 13 also has a transaction request module 34, including the decoder 119, used to decode the received barcode 200, select or otherwise enter (e.g. via a provided graphical user interface generated by the payment application 13 on the user interface 104 of the computer device 8) account information of the funds responder 18 as well as any other relevant responder data 211, and to generate the transfer request 64 directed to the transaction service 20. It is recognized that the transfer request 64 could include decoded funds transfer transaction 5 data (e.g. textual funds information 201) obtained from the symbology information 204 of the barcode 200, and/or at least some of the symbology information 204 itself of the barcode 200), as well as responder account data pertaining to the selected mode of payment/credit.

It could be advantageous for security purposes to allow the transaction request module 34 to decode only a portion of the symbology information 204 (of the barcode 200) pertinent to the funds responder 18 (e.g. the funds amount 203, requestor name or other non-sensitive requestor identification information, unique transfer ID, etc.) and to leave any requestor sensitive information (e.g. requestor account information, for example including PIN or password data) as undecoded (i.e. remain encoded) from the symbology information 204 and therefore abstracted from the funds responder 18. In this manner, the decoder 119 of the transaction request module 34 would not have the ability to decode certain sensitive information in the symbology information 204 pertaining only to the funds requestor 16, in other words only that funds data common to both of the funds requestor 16 and the funds responder 18 is decodable by the decoder 119 (common information for example could be funds amount 203, transfer ID, product description, names of requestor and responder).

One embodiment, to provide for the sensitive portions of the symbology information 204 to remain undecoded, is where the decoder 119 (of the payment application 13) of the computer device 8 does not have access to the encryption key used by the encoder 120 of the payment application 13 of the computer device 12. It is also envisioned that the computer device 12 does not have access to the encryption key used by the decoder 119 of the payment application 13 of the computer device 8. Further, in this example, it is recognized that in the event where the transaction service 20 does receive encoded symbology information 204 in the transaction request 64, the transaction service 20 (e.g. via the registration module 60) would have access to the requestor encryption key and/or the responder encryption key via their respective registration details 17 stored in the database 58.

In cryptography, the encryption key can be defined as a piece of information (a parameter) that determines the functional output of a cryptographic algorithm or cipher (i.e. as implemented by the encoder 120 or decoder 119). Without the key, the algorithm of the encoder 120 or decoder 119 would produce no useful result (i.e. the decoded symbology information 204 would be meaningless). In encryption, the key specifies the particular transformation of plaintext into ciphertext, or vice versa during decryption. Keys can be used in cryptographic algorithms, such as digital signature schemes and message authentication codes.

Further, the transaction request module 34 could also be configured to provide to the user of the computer device 8 (via a presented graphical user interface on the user interface 104 of the computer device 8) the ability to select or otherwise enter the desired responder account (e.g. specifying a credit card number, a debit card number, or any other account information for use in accepting/paying the funds amount 203). The transaction request module 34 could also provide, via the graphical user interface, the ability of the funds responder 18 to enter their PIN (or other password information specific to accessing their financial accounts directly) associated with the specified responder account, thereby indicating that the user of the computer device 8 at the time of generating the transaction request 64 has the authority to authorize the transaction service 20 (e.g. via the transaction processing module 65) to coordinate funds transfer involving the specified responder account. The PIN, or other password information specific to accessing the selected financial accounts directly, can be considered as part of the responder data 211 included in transaction request 64 data, either directly or otherwise abstracted during generation of the transaction request 64. For example, the PIN or other password information would not be the actual PIN or password information made available to the financial institutions of the accounts 70,72, rather would be reference information used by the transaction service 20 (e.g. via the registration module 60) to look up the actual PIN or password information stored in the registration details 17 of the funds responder 18 using the reference PIN or password information provided by the funds responder 18 during generation of the transaction request 64.

This use of PIN or password information is advantageous, in addition to any passwords required to access the computer device 8 in general (e.g. device login) and/or login to the payment application 13 specifically, as the owner of the computer device 8 would not want any unauthorized access to their financial accounts to occur. It is also envisioned that the entered PIN or password information could be done by the user in order to login to the payment application 13 itself (i.e. access the functionality of the payment application 13 provisioned on the computer device 8). It is also recognized that the user of the computer device 8 may wish to have separate PINs or passwords associated with each account accessible through the payment application 13 itself (e.g. selectable) and/or known to the transaction service 20 (e.g. via the registration module 60) via the registration details 17, in addition to a general login (including password) to the computer device 8 and/or payment application 13 in general.

Decoding

One example of the customized coding interpretation scheme 209 for barcodes is modified UPC (Universal Product Code). The numbers and/or letters (e.g. ASCII—American Standard Code for Information Interchange) encoded in the barcode 200 are unique identifiers representing the particular custom code defined in the customized coding scheme 209 that, when read by the barcode decoder 119, can be used to look up additional information about the invoice item associated with the barcode 200. For example, the funds amount 203 and optional description of the product would be stored in the barcode 200 using the symbology information 204, as well as any pertinent requestor data 208 and/or responder data 211. The decoder 119 circuitry and/or software is used to recognize and/or to make sense of the symbology information 204 that make up barcode 200. The decoder 119 can translates symbols 204 into corresponding digital output in a traditional data format (i.e. as textual funds information 201). In order to decode the information in barcode 200, for example for 1D barcodes, the widths of the bars and spaces are recognized via edge detection and their widths measured.

Transaction Service 20 and Transaction Interface 15

Figure 4:
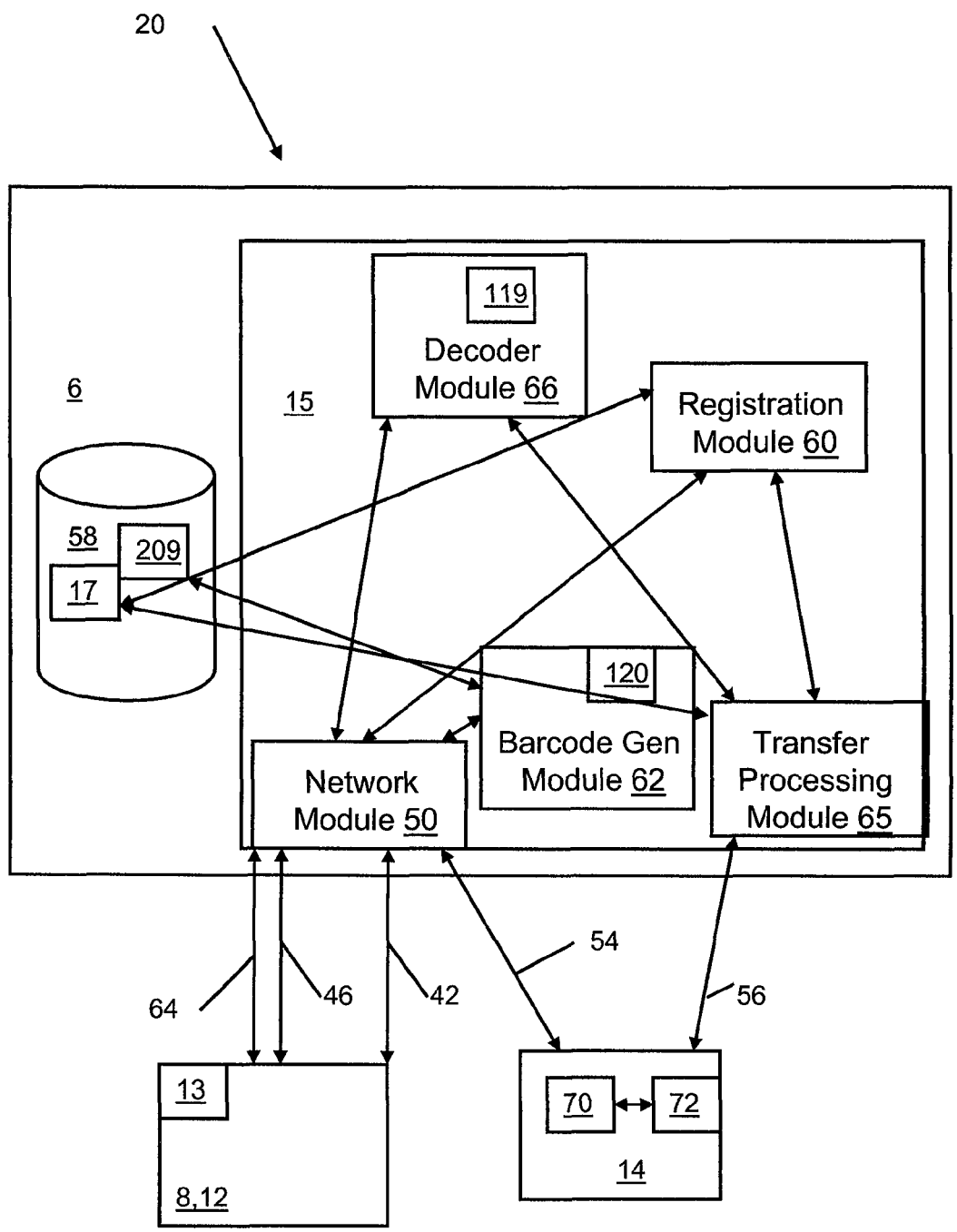
FIG. 4 is a block diagram of an example transaction service for coordinating the funds transfer via the payment application of FIG. 2.

Referring to FIG. 4, shown is an example configuration of the transaction service 20 including the computer device 6 (e.g. a web server) hosting the transaction interface 15. The transaction interface 15 can include a network communications module 50 for receiving order request messages 52 (e.g. providing textual funds information 201 and expecting a generated barcode 200) from the computer device 12 and for sending fund transfer processing messages 54 to the transaction processing system 14 over the communications network 11.

The network communications module 50 can also be configured to send and receive transfer confirmation messages 46 to the computer devices 8,12 (in response to the received transaction request messages 64) over the communications network 11 with respect to the computer devices 8,12. Also included is a database 58 containing registration details 17 of the funds requestor 16 and/or funds responder 16 as discussed above, and network 11 address information of the transaction processing system 14. The database 58 can also have customized barcode definitions of the customized coding scheme 209 containing relationships (e.g. rules) between machine readable symbology and codewords used to encode (or decode) fund information during encoding and/or decoding of symbology information 204 of the barcode 200 used to represent the funds transfer transaction 5.

For example, the customized coding scheme 209 can be used by the barcode generation module 62 to encode (i.e. translate) text based funds information 201 of the funds transfer transaction 5 (including data received from the computer 12) into symbology information 204, performed during generation of the barcode 200. The customized coding scheme 209 can also be used to decode (i.e. interpret) symbology information 204 present in the barcode 200 into text based funds information 201 of the funds transfer transaction 5 during processing of the barcode 200. It is recognized that the customized coding scheme 209 is known to the transaction service 20 and can include customized codewords pertaining to specific funds information such as but not limited to: sensitive responder and requestor financial information.

Referring again to FIG. 4, the transaction interface 15 also has a registration module 60 used to collect the registration details 17 during registration of the funds requestor 16 and/or the funds responder 18. Further to that discussed above, it is recognized that the registration details 17 can include PIN data and/or password data used to access the specified account(s) 70,72 through the financial institutions of the transaction processing system 14. For example, in terms of the requestor or responder bank account information, this could be supplied as part of the reference account information included in the transaction request 64, for example used by the registration module 60 to lookup the actual requestor or responder bank account information in the registration details 17 known only to the transaction service 20, and therefore abstracted from the appropriate requestor or responder.

The transition interface 15 can also have the barcode generation module 62 that is configured, by an encoder 120, to use the received text based funds information 201 data and the customized coding scheme 209 to generate the barcode 200, for subsequent delivery to the computer device 12 and/or the computer device 8 if configured as part of the processing for the funds transfer transaction 5 (i.e. the computer device 12—via the payment application 13 operation—sends the textual funds information 201 to the transaction service 20 and the transaction service 20 then sends the generated barcode 200 directly to the computer device 8 for subsequent processing by its payment application 13). It is recognized that the barcode 200 is generated by the barcode generation module 62 to contain data of the funds transfer transaction 5 pertaining to the funds amount 203 provided by the funds requestor 16, including transaction data needed by the payment transaction processing system 14 to settle the financial transaction by transferring funds between specified accounts 70,72.

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the barcode 200 are unique identifiers representing the particular standard code and custom code (representing invoice specific data) defined in the customized coding scheme 209 that, when read by a barcode decoder 119, can be used to look up additional information about the invoice item associated with the barcode 200.

Accordingly, the barcode generation module 62 takes the text based funds information 201 data and uses the codes and associated rules of the customized coding interpretation scheme 209 to convert a piece of the textual funds information 201 (for example, a letter, word, phrase, etc.) into another form or representation (one sign into another sign), not necessarily of the same type, i.e. the symbology information 204. In information processing performed by the barcode generation module 62, encoding is the process by which textual funds information 201 is converted into symbols (of the symbol format 204 defined by the customized coding scheme 209) to be communicated. Decoding is the reverse process, converting these code symbols 204 back into textual funds information 201 understandable by a receiver. Therefore, the symbology information 204 generated from the textual funds information 201 is used by the barcode generation module 62 to construct the barcode 200, according to the customized coding scheme 209. This barcode 200 is made available to the network communications module 50 to be sent in the order response message 54 (for example) to the computer device 12 (e.g. displayed on a browser screen of the user interface 104 of the computer device 12 or otherwise delivered as an image file in the network message 54, etc.). It is recognized that the barcode 200 represents symbolically the textual data 201. Alternatively, the network communications module 50 could send the barcode 200 in the message 54 to the computer device 8 (e.g. displayed on a browser screen of the user interface 104 of the computer device 8 or otherwise delivered as an image file in the network message 54, etc.).

Referring to FIG. 4, the transaction interface 15 can also have a decoder module 66, including the decoder 119, used to decode the received barcode 200 in the case where the transaction request 64 data includes symbology information 204. For example, the decoder 119 could be used to decode account information of the funds requestor 16 (pertaining to the selected mode of payment/credit of the requestor and optionally including the PIN or password data of the requestor account) as well as any other relevant requestor data 211 from the symbology 204, for example using the respective encryption key stored in the registration details 17 of the funds requestor 16). One embodiment, to provide for the sensitive portions of the symbology information 204 to be decoded, is where the decoder 119 of the computer device 8 has access to the encryption key (via the registration details 17) used by the encoder 120 used by the payment application 13 of the computer device 12. It is also envisioned that the decoder 119 can have access to the encryption key used by the payment application 13 of the computer device 8. Therefore, in the event where the transaction service 20 does receive encoded symbology information 204 in the transaction request 64, the transaction service 20 would have access to the requestor encryption key and/or the responder encryption key via their respective registration details 17 stored in the database 58.

One example of the customized coding interpretation scheme 209 for barcodes is modified UPC (Universal Product Code). The numbers and/or letters (e.g. ASCII—American Standard Code for Information Interchange) encoded in the barcode 200 are unique identifiers representing the particular custom code defined in the customized coding scheme 209 that, when read by the barcode decoder 119, can be used to look up additional information about the invoice item associated with the barcode 200. For example, the funds amount 203 and optional description of the product would be stored in the barcode 200 using the symbology information 204, as well as any pertinent requestor data 208 and/or responder data 211. The decoder 119 circuitry and/or software is used to recognize and/or to make sense of the symbology information 204 that make up barcode 200. The decoder 119 can translates symbols 204 into corresponding digital output in a traditional data format (i.e. as textual funds information 201). In order to decode the information in barcode 200, for example for 1D barcodes, the widths of the bars and spaces are recognized via edge detection and their widths measured.

Referring again to FIG. 4, once all of the textual funds information 201 is received by the transaction interface 15 or otherwise decoded, a transfer processing module 65 communicates using transaction processing messages 56 with the transaction processing system 14. It is recognized that the transaction processing messages 56 could include decoded funds transfer transaction 5 data (e.g. textual funds information 201) obtained from the symbology information 204 of the barcode 200, and/or as received from the computer device 8, including responder and requestor account data and the funds amount 203.

Further, the transfer processing module 65 could be configured to confirm whether the received PIN or password information of the requestor and/or the responder matches the corresponding PIN or password information stored in their respective registration details 17 that is associated with their respective account (e.g. credit card number, a debit card number, or any other account information for use in accepting/paying the funds amount 203). In the event that the received PIN or password information (for the requestor and/or the responder) matches the corresponding PIN or password information stored in their respective registration details 17, the transfer processing module 65 has confirmed that at the time of generating the barcode 200 and/or at the time that the transaction request 64 was generated, the respective funds requestor 16 and/or the respective funds responder 18 had the authority to authorize the transaction service 20 to coordinate funds transfer involving the specified responder/requestor account(s). In the event that the received PIN or password information (for the requestor and/or the responder) does not match the corresponding PIN or password information stored in their respective registration details 17, the transfer processing module 65 could deny the transaction request 64 and send notice of the denial back to the computer devices 8,12 via the respective transaction confirmation messages 46. For example, if both matches fail, then both of the computer devices 8,12 would be notified of the denial. Otherwise if only one of matches failed, then the respective one of the computer devices 8,12 would be notified of the denial.

In any event, the transfer processing module 65 is also configured to receive confirmation message(s) 56 from the transaction processing system 14, such that confirmation message(s) 56 include a confirmation that the funds amount has either been transferred between accounts 70,72 or declined. The confirmation message(s) 56 sent by the transaction service 20 can include instructions to the respective financial institutions (not shown), for example, associated with the customer and merchant account information to debit the appropriate account 70,72 and credit the appropriate account 70,72 by the funds amount 203 along with the required account data and (optional) PIN or password data. The confirmation message(s) 56 received by the transaction interface 15 from the transaction payment processing system 14 could contain details of the payment processing including that the accounts were (or will be) credited by the amount, as well as any transfer data 210 (e.g. transfer ID) for requestor/responder accounting records.

In is recognized in the above embodiments, that in terms of the account information, this could be supplied as specifically the account number or this could be supplied as identification information (e.g. account ID) used by the transaction service 20 to lookup the actual bank account information known to the transaction service 20 (via the respective registration details 17) and therefore the account number would be abstracted from the general communications over the network 11.

Computer Device 8,12

Figure 5:
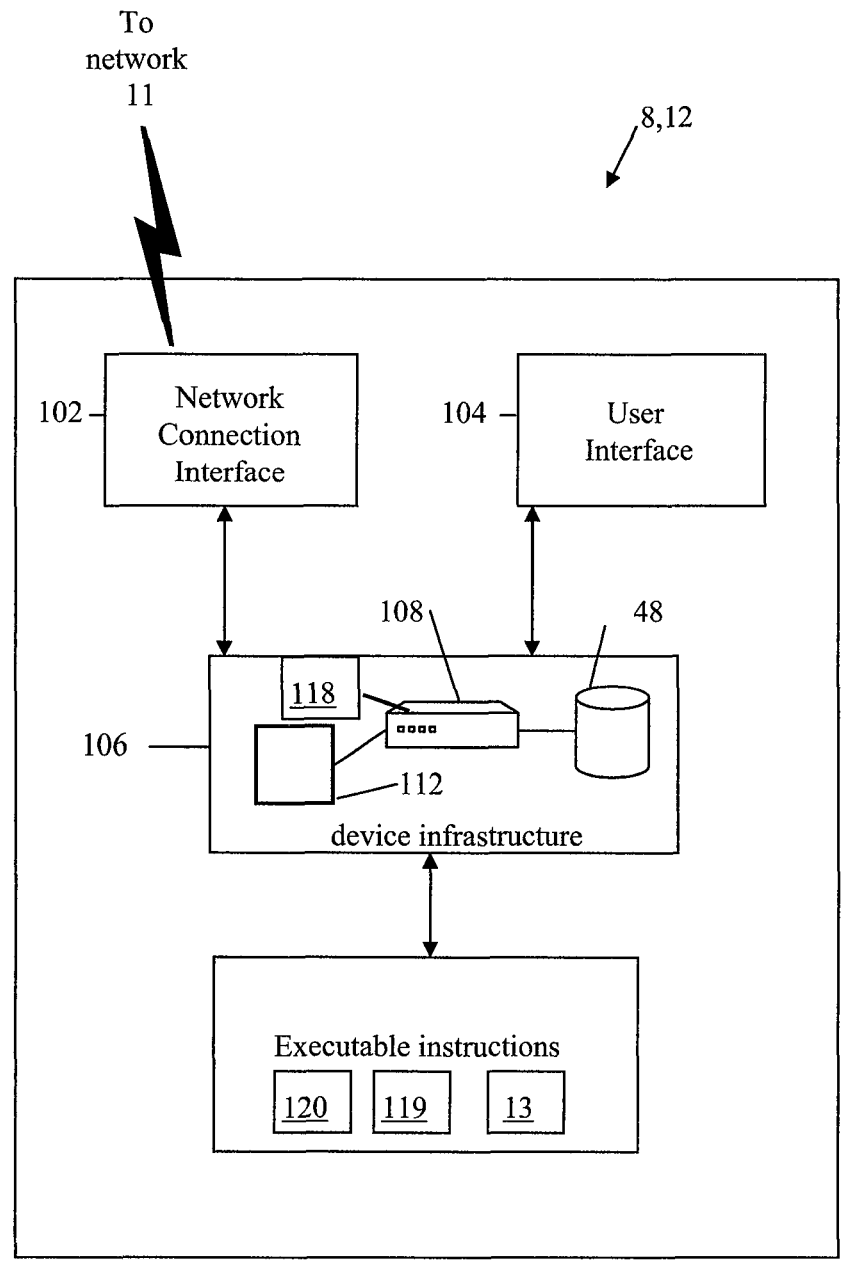
FIG. 5 is a block diagram of a computer device implementing the payment application of FIG. 2.

Referring to FIG. 5, each computer device 8,12 can be a wireless-enabled (e.g. WiFi, WAN, etc.) personal data assistant, or email-enabled wireless telephone, or a desktop computer terminal. In addition, the wireless communications are not limited to only facilitating transmission of text data (e.g. encrypted) and can therefore be used to transmit image data, audio data or multimedia data, for example, as desired.

As shown in FIG. 5, the computer device 8,12 comprises a communication network interface 102, a user interface 104, and a data processing system 106 in communication with the network interface 102 and the user interface 104. The network interface 102 can include one or more antennas for wireless communication over the communications network 11. Preferably, the user interface 104 comprises a data entry device (such as keyboard, microphone or writing tablet), and a display device (such as an LCD display). The display screen of the user interface 104 can be used to visually present a graphical user interface (GUI) of the payment application 13 to the user, including results of the barcode 200 image capture process and processing. The display screen can employ a touch screen display, in which case the user can manipulate (i.e. enter and/or modify/delete) funds information (e.g. product data 206, requestor data 208, responder data 211 and/or transfer data 210) obtained as textual invoice information 201 from the decoded barcode 200 and/or as supplemental information (e.g. requestor data 208, responder data 211) added to the textual invoice information 201 in order to generate the transaction request 64.

The data processing system 106 includes a central processing unit (CPU) 108, otherwise referred to as a computer processor, and a non-volatile memory storage device (e.g. DISC) 48 (such as a magnetic disc memory or electronic memory) and a read/write memory (RAM) 112 both in communication with the CPU 108. The memory 48 includes data which, when loaded into the RAM, comprise processor instructions for the CPU 108 which define memory objects for allowing the computer devices 8, 12 to communicate with one another and the transaction service 20 (for accessing the transaction interface 15) and the transaction processing system 14 (e.g. one or more processing servers) over the communications network 11. The mobile device 8,12, and the processor instructions for the CPU 108 will be discussed in greater detail below.

The CPU 108 is configured for execution of a payment application 13 for facilitating communication between the transaction processing system 14, the computer device 8, 12 and the computer device 6 of the transaction service 20. For example, it is recognised that the payment application 13 is used to coordinate, as implemented by the CPU 108, the generation, receipt, and processing of the barcode 200 and the transaction messages 64. For example, the payment application 13 can operate the imager 118 and the encoder/decoder 119,120.

The CPU 108 facilitates performance of the computer device 8,12 configured for the intended task (e.g. of the respective module(s) of the payment application 13) through operation of the network interface 102, the user interface 104 and other application programs/hardware (e.g. web browser made available to the payment application 13) of the computer device 8, 12 by executing task related instructions. These task related instructions can be provided by an operating system, and/or software applications located in memory, and/or by operability that is configured into the electronic/digital circuitry of the processor(s) 108 designed to perform the specific task(s), including operation of the modules 30,32, 33,34,40. Further, it is recognized that the device infrastructure 106 can include a computer readable storage medium 48 coupled to the processor 108 for providing instructions to the processor 108 and/or to load/update the instructions. The computer readable medium 48 can include hardware and/or software such as, by way of example only, memory cards such as flash memory or other solid-state memory.

Further, it is recognized that the computer device 8, 12 can include the executable applications comprising code or machine readable instructions for implementing predetermined functions/operations including those of an operating system, the imager 118, the decoder 119, the encoder 120 and the payment application 13, for example. The processor 108 as used herein is a configured device and/or set of machine-readable instructions for performing operations as described by example above, including those operations as performed by any or all of the imager 118, the decoder 119, the encoder 120 and the payment application 13. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

The data processing system 106 includes the imager 118 (e.g. a camera including an image sensor—e.g. CCD or CMOS sensor) suitable for capturing images of the barcode 200 displayed or otherwise presented by the merchant 16 within range of the imager 118. The payment application 13 is configured to control the operation of the imager 118 to capture the image of the barcode 200, as well as to operate the decoder to provide for decoding at least a portion of the symbology information 204 into textual invoice information 201 for subsequent use in generating the transaction request message 64 directed to the transaction service 20. The storage 48 can also contain the customized coding interpretation scheme 209 for use in decoding/encoding the barcode 200.

Transaction Service Device 6

Figure 6:
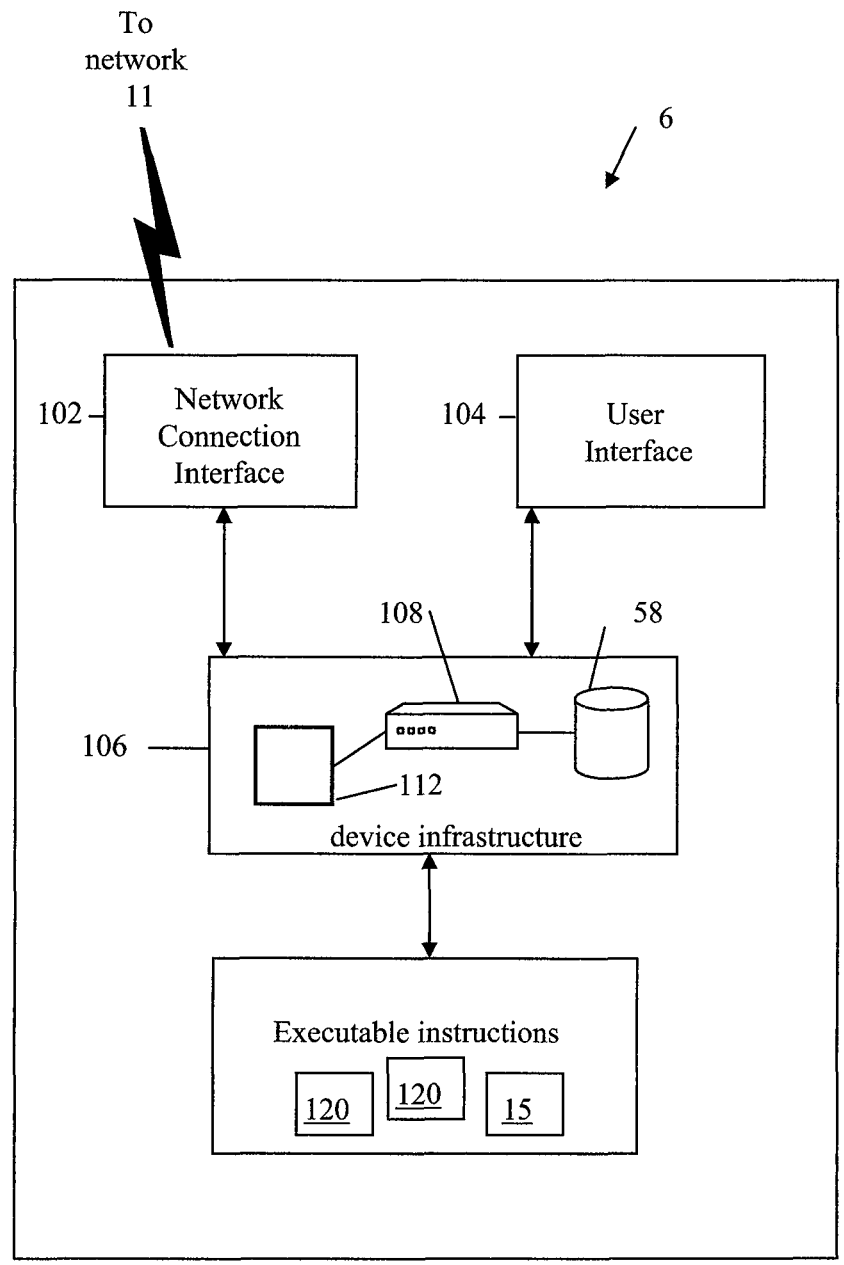
FIG. 6 is a block diagram of a computer device implementing the transaction service of FIG. 4.

Referring to FIG. 6, the device 6 can be a wireless-enabled (e.g. WiFi, WAN, etc.) personal data assistant, or email-enabled wireless telephone, for example a tablet. In addition, the wireless communications are not limited to only facilitating transmission of text data (e.g. encrypted) and can therefore be used to transmit image data, audio data or multimedia data, for example, as desired. Preferably, the device 6 is a network server.

As shown in FIG. 6, the device 6 can comprise a communication network interface 102, a user interface 104, and a data processing system 106 in communication with the network interface 102 and the user interface 104. The network interface 102 can include one or more antennas for wireless communication over the communications network 11. The user interface 104 can comprise a data entry device (such as keyboard, microphone or writing tablet), and a display device (such as an LCD display).

The data processing system 106 includes a central processing unit (CPU) 108, otherwise referred to as a computer processor, and a non-volatile or volatile memory storage device (e.g. DISC) 58 (such as a magnetic disc memory or electronic memory) and a read/write memory (RAM) 112 both in communication with the CPU 108. The memory 58 includes data which, when loaded into the RAM, comprise processor instructions for the CPU 108 which define memory objects for allowing the device 6 to communicate with the computer devices 8,12 and the transaction processing system 14 (e.g. one or more processing servers) over the communications network 11. The instructions can be used to provide or otherwise host the transaction interface 15 as a website running on the computer device 6 and accessed via the network 11.

The CPU 108 is configured for execution of the transaction interface 15 for facilitating communication with the transaction processing system 14 and the computer devices 8,12. For example, it is recognised that the transaction interface 15 is used to coordinate, as implemented by the CPU 108, the generation, receipt, and processing of the textual invoice information 201 and the symbology information 204 of the barcode 200, as well as coordinating the settlement of funds transfer of the funds amount 203 between the specified accounts 70,72.

The CPU 108 facilitates performance of the device 6 configured for the intended task (e.g. of the respective module(s) of the transaction interface 15) through operation of the network interface 102, the user interface 104 and other application programs/hardware (e.g. web service made available through the transaction interface 15) of the device 6 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include the computer readable storage medium 58 coupled to the processor 108 for providing instructions to the processor 108 and/or to load/update the instructions. The computer readable medium 58 can include hardware and/or software such as, by way of example only, memory cards such as flash memory or other solid-state memory. The storage 58 can also contain the customized coding interpretation scheme 209 for use in encoding and/or decoding the barcode 200.

Further, it is recognized that the device 6 can include the executable applications comprising code or machine readable instructions for implementing predetermined functions/operations including those of an operating system and the modules 50,60,62,63,65,66 for example. The processor 108 as used herein is a configured device and/or set of machine-readable instructions for performing operations as described by example above, including those operations as performed by any or all of the modules 50,60,62,63,65, 66. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

Operation of the Funds Transfer Transaction System 10

Figure 7:
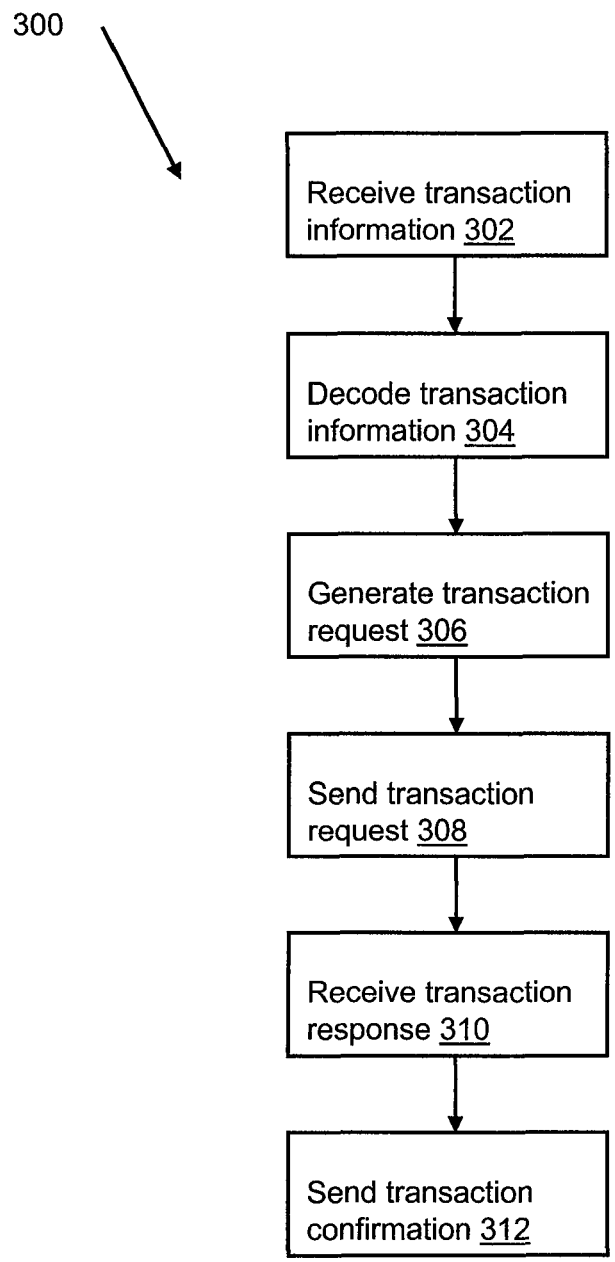
FIG. 7 is an example operation of the system of FIG. 1.

Referring to FIGS. 1, 4 and 7, shown is an example operation 300 of the transaction interface 15 of the transaction service 20. The transaction system is configured for coordinating processing of the funds transfer transaction 5 between the transaction requestor 16 and a transaction responder 18 over the communications network 11. The transaction interface 15, as described above, uses its computer processor coupled to memory, wherein the computer processor is programmed to coordinate processing of the funds transfer transaction 5 by the example operation 300.

At step 302, the transaction interface 15 receives (e.g. via the network module 50) the funds amount 203, requestor identification information 208, and responder identification information 211, such that at least one of the funds amount 203, the requestor identification information 208, or the responder identification information 211 is encoded in symbology information 204 embodied in the barcode 200. At step 304, the decoder module 66 decodes the symbology information 204 into unencoded information 201 using the coding scheme 209 of the barcode 200. At step 306, the transfer processing module 65 generates the funds transfer request 56 for the funds transfer transaction 5, such that the funds transfer request 56 has content including the funds amount 203 and financial account 70,72 information pertaining to at least one of the requestor identification information 208 or the responder identification information 211, such that at least a portion of the content includes the unencoded information 201 decoded from the symbology information 204. At step 308, the transfer processing module 65 sends the funds transfer request 56 to the transaction processing system 14 for subsequent settlement.

At step 310, the funds transfer request 56 (or network module 50) receives the funds transfer response 54 from the transaction processing system 14, such that the funds transfer response 54 has settlement information confirming at least one of account credit information or account debit information of the funds amount 203. At step 312, the network module 50 sends the transaction confirmation message 46 to at least one of the transaction requestor 16 or the transaction responder 18 via their computer devices 8,12, such that the transaction confirmation message 46 includes the settlement information relevant to the at least one of the transaction requestor 16 or the transaction responder 18.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

I claim:

1. A transaction system for coordinating remote processing of a funds transfer transaction between a transaction requestor and a transaction responder remotely over a communications network, the transaction system comprising:
a computer processor coupled to a memory, wherein the computer processor is programmed to coordinate processing of the funds transfer transaction by:
receiving from the transaction responder over the communications network a funds amount, requestor identification information, requestor password information associated with a financial account of the transaction requestor, and responder identification information, such that the requestor password information is encoded in symbology information embodied in a barcode;
decoding the symbology information into unencoded information using a coding scheme of the barcode;
matching the requestor password information with corresponding stored requestor registration information in the memory;
generating the funds transfer request for the funds transfer transaction, the funds transfer request having content including the funds amount and financial account information pertaining to the requestor identification information and the responder identification information; and
sending the funds transfer request to a transaction processing system for subsequent settlement to effect transfer of funds representing the funds amount from a financial account of the transaction responder to the financial account of the transaction requestor.

2. The system of claim 1, wherein the computer processor is further programmed to:
receive a funds transfer response from the transaction processing system, the funds transfer response having settlement information confirming at least one of account credit information or account debit information of the funds amount; and
send a transaction confirmation message to at least one of the transaction requestor or the transaction responder, the transaction confirmation message including the settlement information relevant to the at least one of the transaction requestor or the transaction responder.

3. The system of claim 2, wherein the transaction confirmation message includes product information associated with the funds amount and a unique transfer identifier of the funds transfer transaction.

4. The system of claim 3, wherein the product information is selected from the group consisting of restaurant meal information; retail items; a loan between the transaction requestor and the transaction responder; a debt between the transaction requestor and the transaction responder; and individual product information.

5. The system of claim 1, wherein the content of the funds transfer request includes the funds amount and the financial account information pertaining to both of the requestor identification information and the responder identification information.

6. The system of claim 5, wherein the computer processor is further programmed to:
receive a funds transfer response from the transaction processing system, the funds transfer response having settlement information confirming account credit information and account debit information of the funds amount; and
send respective transaction confirmation messages to the transaction requestor and the transaction responder, each of the respective transaction confirmation messages including the settlement information appropriate to respective one of the transaction requester or the transaction responder.

7. The system of claim 1, wherein the symbology information is embodied as a 2D barcode.

8. The system of claim 7, wherein the 2D barcode and corresponding coding scheme are for a barcode type selected from the group consisting of QR codes and Microsoft TM Tag codes.

9. The system of claim 1, wherein the computer processor is further programmed to: use the responder identification information to look up the financial account information of the transaction responder stored in the memory.

10. The system of claim 9, wherein the transaction responder has responder registration information stored in the memory.

11. The system of claim 10, wherein the responder registration information includes PIN or password information for use in authorizing access to the financial account of the transaction responder and the computer processor is further programmed to receive the PIN or password information from the transaction responder over the communications network and match the received PIN or password information with the stored PIN or password information before sending the funds transfer request.

12. The system of claim 11, wherein the responder identification information includes encrypted information and the computer processor is further programmed to decrypt the encrypted information of the responder identification information.

13. The system of claim 9, wherein the funds requestor is a credit account holder and the funds responder is a debit account holder of the funds transfer transaction.

14. The system of claim 13, wherein the barcode is a barcode image captured using an image scanner of a mobile device of the transaction responder.

15. The system of claim 1, wherein the computer processor is further programmed to: use the responder identification information to look up the financial account information of the responder stored in the memory.

16. The system of claim 1, wherein the computer processor is further programmed to generate the symbology information based on a transaction request received from a computer device of the transaction requestor and send the generated symbology information to the computer device.

17. The system of claim 16, wherein the symbology information includes a unique transfer identifier of the funds transfer transaction.

18. The system of claim 16, wherein transaction request includes the requester identification information and the funds amount.

19. A method for coordinating remote processing of a funds transfer transaction between a transaction requestor and a transaction responder remotely over a communications network, the method comprising:
receiving from the transaction responder over the communications network a funds amount, requestor identification information, requester password information associated with a financial account of the transaction requestor, and responder identification information, such that the requestor password information is encoded in symbology information embodied in a barcode;
decoding, using a computer processor, the symbology information into unencoded information using a coding scheme of the barcode;
matching the requestor password information with corresponding stored requester registration information in the memory;
generating, using the computer processor, the funds transfer request for the funds transfer transaction, the funds transfer request having content including the funds amount and financial account information pertaining to the requestor identification information and the responder identification information; and
sending the funds transfer request to a transaction processing system for subsequent settlement to effect transfer of funds representing the funds amount from a financial account of the transaction responder to the financial account of the transaction requestor.

20. A non-transitory computer readable storage medium with an executable program application stored thereon, the program application configured for coordinating remote processing of a funds transfer transaction involving a transaction requestor and a transaction responder, the program application configured as a client of a transaction service accessible remotely over a communications network, wherein the program application instructs a computer processor to perform the following steps of:
collecting a funds amount, requestor identification information and requestor password information associated with a financial account of the transaction requestor, such that the requestor password information is encoded in symbology information embodied in a barcode;
receiving responder identification information including a financial account selected by the responder;
generating a transaction request to have content of the funds amount, the requestor identification information, the reguestor password information and the responder identification information;
sending a transaction request to the transaction service over the communications network; and
receiving a transaction confirmation message including settlement information pertaining to the funds transfer transaction.

21. The non-transitory computer readable storage medium of claim 20, wherein the program application instructs the computer processor to perform the following further step of:

operating an imager to capture an image of the barcode prior to said collecting step.

22. The non-transitory computer readable storage medium of claim 20, wherein the program application is configured for provisioning on a mobile device.

* * * * *